(12) United States Patent
Ghanbarinejad et al.

(10) Patent No.: US 12,537,649 B2
(45) Date of Patent: Jan. 27, 2026

(54) INTEGRATED ACCESS AND BACKHAUL NODE CONFIGURATION

(71) Applicant: Lenovo (Singapore) Pte. Ltd., New Tech Park (SG)

(72) Inventors: Majid Ghanbarinejad, Chicago, IL (US); Vijay Nangia, Woodridge, IL (US); Hyejung Jung, Northbrook, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 322 days.

(21) Appl. No.: 18/549,126

(22) PCT Filed: Mar. 3, 2022

(86) PCT No.: PCT/IB2022/051894
§ 371 (c)(1),
(2) Date: Sep. 5, 2023

(87) PCT Pub. No.: WO2022/185252
PCT Pub. Date: Sep. 9, 2022

(65) Prior Publication Data
US 2024/0146480 A1    May 2, 2024

Related U.S. Application Data

(60) Provisional application No. 63/156,256, filed on Mar. 3, 2021.

(51) Int. Cl.
*H04L 5/00* (2006.01)
*H04W 16/28* (2009.01)
(Continued)

(52) U.S. Cl.
CPC ........... *H04L 5/0051* (2013.01); *H04W 16/28* (2013.01); *H04W 76/20* (2018.02); *H04W 88/08* (2013.01)

(58) Field of Classification Search
CPC .... H04L 5/0051; H04W 16/28; H04W 76/20; H04W 88/08; H04B 7/15528
See application file for complete search history.

(56) References Cited

U.S. PATENT DOCUMENTS

2020/0228190 A1    7/2020  Cirik et al.
2021/0345345 A1   11/2021  Liu et al.
(Continued)

FOREIGN PATENT DOCUMENTS

CN    111436145 A    7/2020

OTHER PUBLICATIONS

PCT/IB2022/051894, "International Search Report and the Written Opinion of the International Searching Authority, or the Declaration", International Searching Authority, Jun. 1, 2022, pp. 1-16.

(Continued)

*Primary Examiner* — Eric Myers
(74) *Attorney, Agent, or Firm* — Kunzler Bean & Adamson

(57) ABSTRACT

Apparatuses, methods, and systems are disclosed for an integrated access and backhaul node configuration. One method includes receiving, at an integrated access and backhaul (IAB) node including an IAB mobile terminal (IAB-MT) and an IAB distributed unit (IAB-DU), a first configuration of a reference signal associated with the IAB-DU. The method includes receiving a second configuration of a resource associated with the IAB-DU. The second configuration indicates that the resource is soft. The method includes receiving a control message from a parent node. The control message includes an index to the reference signal. The method includes receiving an availability indication from the parent node. The availability indication indicates whether the resource is available. The method includes determining whether to perform a first operation by (Continued)

the IAB-MT and a second operation by the IAB-DU simultaneously.

20 Claims, 25 Drawing Sheets

(51) Int. Cl.
*H04W 76/20* (2018.01)
*H04W 88/08* (2009.01)

(56) References Cited

U.S. PATENT DOCUMENTS

2023/0180248 A1* 6/2023 Shim ............... H04L 5/001
2024/0155652 A1* 5/2024 Noh ............... H04W 72/27

OTHER PUBLICATIONS

Lenovo et al., "Enhancements to resource multiplexing for IAB", 3GPP TSG RAN WG1 Meeting #103-e R1-2009108, Oct. 26-Nov. 13, 2020, pp. 1-7.

Qualcomm, "New WID on Enhancements to Integrated Access and Backhaul", 3GPP TSG RAN Meeting #88e RP-201293, Jun. 29-Jul. 3, 2020, pp. 1-5.

3GPP, "RAN1 Chairman's Notes", 3GPP TSG RAN WG1 Meeting #103-e, Oct. 26-Nov. 13, 2020, pp. 1-108.

3GPP, "RAN1 Chairman's Notes", 3GPP TSG RAN WG1 Meeting #104-e, Jan. 25-Feb. 5, 2021, pp. 1-57.

3GPP, "3rd Generation Partnership Project; Technical Specification Group Radio Access Network; NR; Study on Integrated Access and Backhaul; (Release 16)", 3GPP TR 38.874 V16.0.0, Dec. 2018, pp. 1-111.

3GPP, "3rd Generation Partnership Project; Technical Specification Group Radio Access Network; NR; Physical channels and modulation (Release 16)", 3GPP TS 38.211 V16.4.0, Dec. 2020, pp. 1-133.

3GPP, "3rd Generation Partnership Project; Technical Specification Group Radio Access Network; NR; Multiplexing and channel coding (Release 16)", 3GPP TS 38.212 V16.4.0, Dec. 2020, pp. 1-152.

3GPP, "3rd Generation Partnership Project; Technical Specification Group Radio Access Network; NR; Physical layer procedures for control (Release 16)", 3GPP TS 38.213 V16.4.0, Dec. 2020, pp. 1-181.

3GPP, "3rd Generation Partnership Project; Technical Specification Group Radio Access Network; NR; Physical layer procedures for data (Release 16)", 3GPP TS 38.214 V16.4.0, Dec. 2020, pp. 1-169.

3GPP, "3rd Generation Partnership Project; Technical Specification Group Radio Access Network; NR; Physical layer measurements (Release 16)", 3GPP TS 38.215 V16.4.0, Dec. 2020, pp. 1-25.

3GPP, "3rd Generation Partnership Project; Technical Specification Group Radio Access Network; NR; Medium Access Control (MAC) protocol specification (Release 16)", 3GPP TS 38.321 V16.3.0, Dec. 2020, pp. 1-156.

3GPP, "3rd Generation Partnership Project; Technical Specification Group Radio Access Network; NR; Radio Resource Control (RRC) protocol specification (Release 16)", 3GPP TS 38.331 V16.3.1, Jan. 2021, pp. 1-932.

3GPP, "3rd Generation Partnership Project; Technical Specification Group Radio Access Network; NG-RAN; F1 application protocol (F1AP) (Release 16)", 3GPP TS 38.473 V16.4.0, Jan. 2021, pp. 1-461.

* cited by examiner

```
-- ASN1START
-- TAG-AVAILABILITYCOMBINATIONSPERCELL-START

AvailabilityCombinationsPerCell-r16 ::=    SEQUENCE {
    availabilityCombinationsPerCellIndex-r16    AvailabilityCombinationsPerCellIndex-r16,
    iab-DU-CellIdentity-r16                     CellIdentity,
    positionInDCI-AI-r16                        INTEGER(0..maxAI-DCI-PayloadSize-r16-1)
OPTIONAL,  -- Need M
    availabilityCombinations-r16                SEQUENCE (SIZE
(1..maxNrofAvailabilityCombinationsPerSet-r16)) OF AvailabilityCombination-r16,
    ...
}

AvailabilityCombinationsPerCellIndex-r16 ::= INTEGER(0..maxNrofDUCells-r16)

AvailabilityCombination-r16 ::=    SEQUENCE {
    availabilityCombinationId-r16              AvailabilityCombinationId-r16,
    resourceAvailability-r16                   SEQUENCE (SIZE
(1..maxNrofResourceAvailabilityPerCombination-r16)) OF INTEGER (0..7)
}

AvailabilityCombinationId-r16 ::=    INTEGER (0..maxNrofAvailabilityCombinationsPerSet-r16-1)

-- TAG-AVAILABILITYCOMBINATIONSPERCELL-STOP
-- ASN1STOP
```

```
-- ASN1START
-- TAG-AVAILABILITYINDICATOR-START

AvailabilityIndicator-r16 ::=    SEQUENCE {
    ai-RNTI-r16                     AI-RNTI-r16,
    dci-PayloadSizeAI-r16           INTEGER (1..maxAI-DCI-PayloadSize-r16),
    availableCombToAddModList-r16   SEQUENCE (SIZE(1..maxNrofDUCells-r16)) OF
AvailabilityCombinationsPerCell-r16                 OPTIONAL,  -- Need N
    availableCombToReleaseList-r16  SEQUENCE (SIZE(1..maxNrofDUCells-r16)) OF
AvailabilityCombinationsPerCellIndex-r16            OPTIONAL,  -- Need N
    ...
}

AI-RNTI-r16 ::=                     RNTI-Value

-- TAG-AVAILABILITYINDICATOR-STOP
-- ASN1STOP
```

```
GNB-DU-Cell-Resource-Configuration   ::= SEQUENCE {
    subcarrierSpacing               SubcarrierSpacing,
    dUFTransmissionPeriodicity      DUFTransmissionPeriodicity  OPTIONAL,
    dUF-Slot-Config-List            DUF-Slot-Config-List        OPTIONAL,
    hSNATransmissionPeriodicity     HSNATransmissionPeriodicity,
    hNSASlotConfigList              HSNASlotConfigList          OPTIONAL,
    iE-Extensions                   ProtocolExtensionContainer { { GNB-DU-Cell-Resource-
Configuration-ExtIEs } } OPTIONAL
}

HSNASlotConfigList ::= SEQUENCE (SIZE(1..maxnoofHSNASlots)) OF HSNASlotConfigItem HSNASlotConfigItem ::= SEQUENCE {
    hSNADownlink        HSNADownlink        OPTIONAL,
    hSNAUplink          HSNAUplink          OPTIONAL,
    hSNAFlexible        HSNAFlexible        OPTIONAL,
    iE-Extensions       ProtocolExtensionContainer { { HSNASlotConfigItem-ExtIEs } } OPTIONAL
}

HSNASlotConfigItem-ExtIEs F1AP-PROTOCOL-EXTENSION ::= {
    ...
}
HSNADownlink ::= ENUMERATED { hard, soft, notavailable }

HSNAFlexible ::= ENUMERATED { hard, soft, notavailable }

HSNAUplink ::= ENUMERATED { hard, soft, notavailable }

HSNATransmissionPeriodicity ::= ENUMERATED { ms0p5, ms0p625, ms1, ms1p25, ms2, ms2p5, ms5, ms10,
    ms20, ms40, ms80, ms160, ...}
```

```
SpatialRSNA-Config ::=    SEQUENCE {
    hardTCI-States           SEQUENCE (SIZE (1..maxNrofTCI-States)) OF TCI-StateId    OPTIONAL,
    softTCI-States           SEQUENCE (SIZE (1..maxNrofTCI-States)) OF TCI-StateId    OPTIONAL,
    na-TCI-States            SEQUENCE (SIZE (1..maxNrofTCI-States)) OF TCI-StateId    OPTIONAL
}
```

```
TCI-State ::=          SEQUENCE {
    tci-StateId            TCI-StateId,
    qcl-Type1              QCL-Info,
    qcl-Type2              QCL-Info                              OPTIONAL,
    hsna                   ENUMERATED {hard, soft, na}           OPTIONAL
    ...
}
```

```
SpatialHS-Config ::=    SEQUENCE {
    hardTCI-States         SEQUENCE (SIZE (1..maxNrofTCI-States)) OF TCI-StateId   OPTIONAL,
    softTCI-States         SEQUENCE (SIZE (1..maxNrofTCI-States)) OF TCI-StateId   OPTIONAL
}
```

```
TCI-State ::=            SEQUENCE {
    tci-StateId              TCI-StateId,
    qcl-Type1                QCL-Info,
    qcl-Type2                QCL-Info                              OPTIONAL,
    hs                       ENUMERATED (hard, soft)               OPTIONAL
    ...
}
```

```
GNB-DU-Cell-Resource-Configuration ::= SEQUENCE {
    subcarrierSpacing               SubcarrierSpacing,
    dUFTransmissionPeriodicity      DUFTransmissionPeriodicity      OPTIONAL,
    dUF-Slot-Config-List            DUF-Slot-Config-List            OPTIONAL,
    hSNATransmissionPeriodicity     HSNATransmissionPeriodicity,
    hSNASlotConfigList              HSNASlotConfigList              OPTIONAL,
    hSNASpatialConfigList           HSNASpatialConfigList           OPTIONAL,
    ...
}

HSNASpatialConfigList ::= SEQUENCE (SIZE(1..maxnoofHSNASpatial)) OF HSNASpatialConfigItem HSNASpatialConfigItem ::=           SEQUENCE {
    timeFreqResource                TimeFreqResource                OPTIONAL,
    hsna                            ENUMERATED (hard, soft, notavailable)  OPTIONAL,
    ...
}
```

```
TCI-State ::=           SEQUENCE {
    tci-StateId         TCI-StateId,
    qcl-Type1           QCL-Info,
    qcl-Type2           QCL-Info                        OPTIONAL,    -- Need R
    ...
}

QCL-Info ::=            SEQUENCE {
    Cell                ServCellIndex                   OPTIONAL,    -- Need R
    bwp-Id              BWP-Id                          OPTIONAL,    -- Cond CSI-RS-Indicated
    referenceSignal     CHOICE {
        csi-rs              NZP-CSI-RS-ResourceId,
        ssb                 SSB-Index
    },
    qcl-Type            ENUMERATED {typeA, typeB, typeC, typeD},
    ...
}
```

```
GNB-DU-Cell-Resource-Configuration ::= SEQUENCE {
    subcarrierSpacing                   SubcarrierSpacing,
    dUFTransmissionPeriodicity          DUFTransmissionPeriodicity          OPTIONAL,
    dUF-Slot-Config-List                DUF-Slot-Config-List                OPTIONAL,
    hSNATransmissionPeriodicity         HSNATransmissionPeriodicity,
    hSNASlotConfigList                  HSNASlotConfigList                  OPTIONAL,
    hSNASpatialConfigList2              HSNASpatialConfigList2              OPTIONAL,
    ...
}

HSNASpatialConfigList2 ::= SEQUENCE (SIZE(1..maxnoofHSNASpatial)) OF HSNASpatialConfigItem2

HSNASpatialConfigItem2 ::=              SEQUENCE {
    timeFreqResource                    TimeFreqResource                    OPTIONAL,
    hsna                                ENUMERATED (hard, soft, notavailable) OPTIONAL,
    ...
}
```

FIG. 19

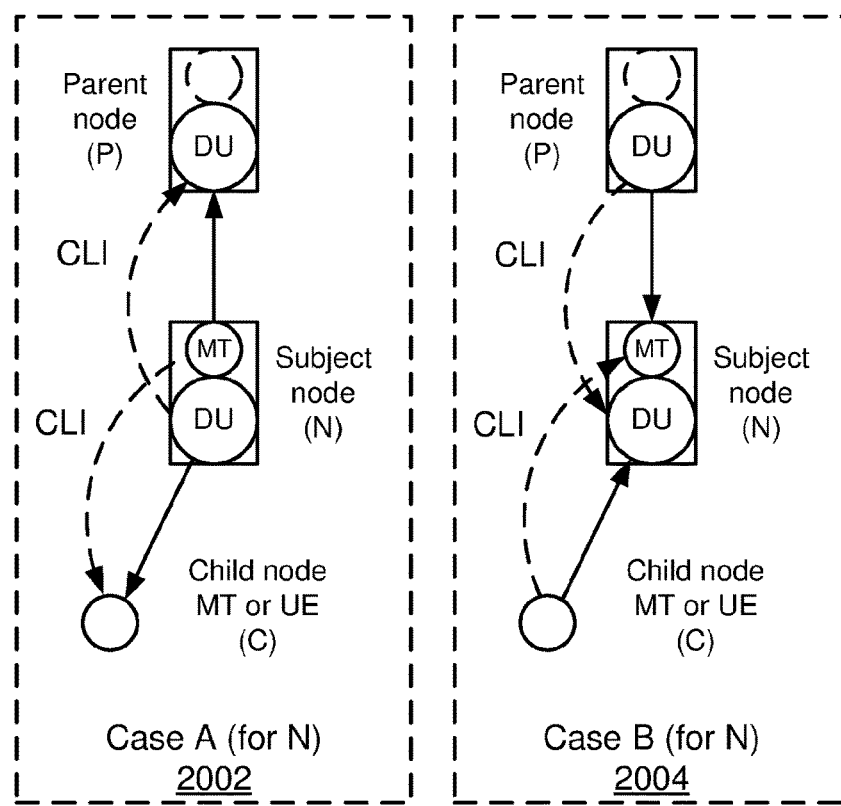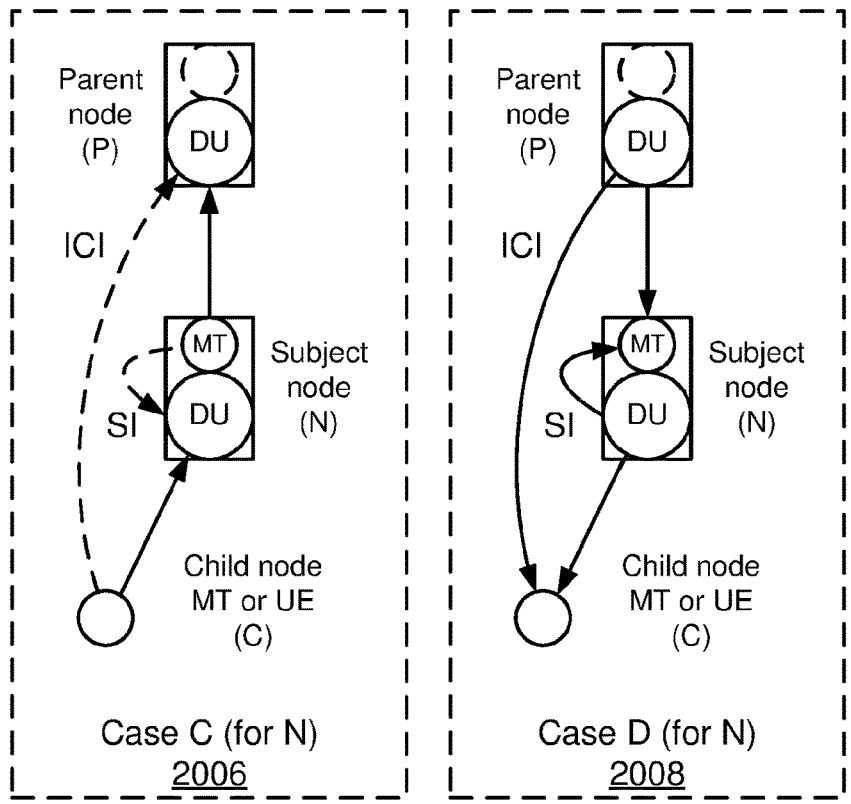
FIG. 20

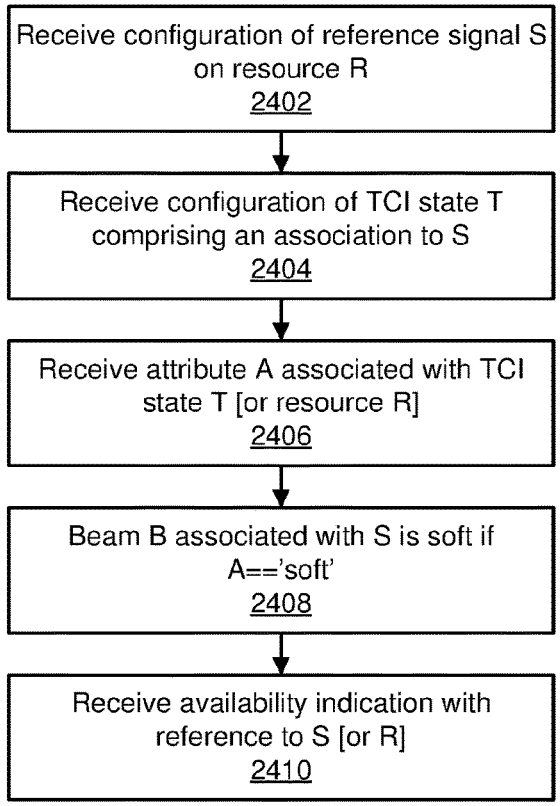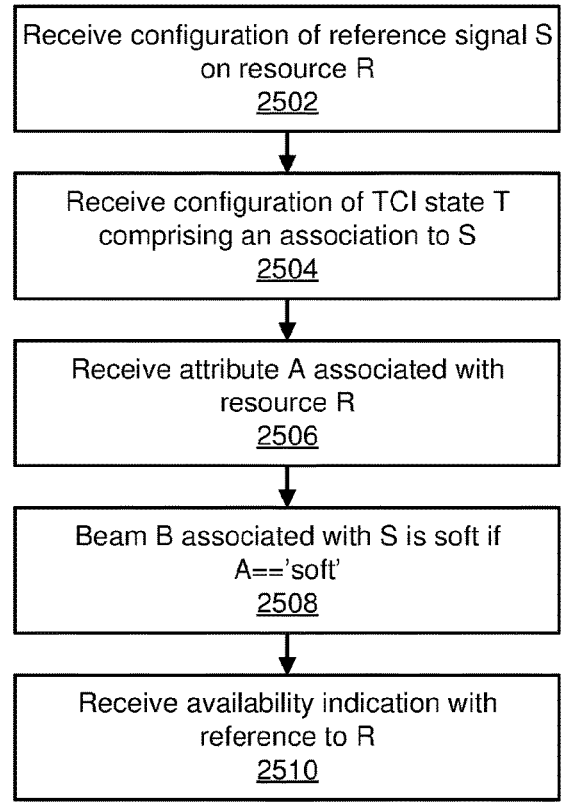
FIG. 24
FIG. 25

INTEGRATED ACCESS AND BACKHAUL NODE CONFIGURATION

CROSS-REFERENCE TO RELATED APPLICATIONS

This application claims priority to U.S. Patent Application Ser. No. 63/156,256 entitled "APPARATUSES, METHODS, AND SYSTEMS FOR SPATIAL RESOURCE MANAGEMENT IN INTEGRATED ACCESS AND BACKHAUL" and filed on Mar. 3, 2021 for Majid Ghanbarinejad, which is incorporated herein by reference in its entirety.

FIELD

The subject matter disclosed herein relates generally to wireless communications and more particularly relates to an integrated access and backhaul node configuration.

BACKGROUND

In certain wireless communications networks, integrated access and backhaul ("IAB") systems may be used. In such networks, the IAB nodes in the IAB system may have multiple antenna panels operating with simultaneous transmissions and receptions.

BRIEF SUMMARY

Methods for an integrated access and backhaul node configuration are disclosed. Apparatuses and systems also perform the functions of the methods. One embodiment of a method includes receiving, at an integrated access and backhaul (IAB) node including an IAB mobile terminal (IAB-MT) and an IAB distributed unit (IAB-DU), a first configuration of a reference signal associated with the IAB-DU. In some embodiments, the method includes receiving a second configuration of a resource associated with the IAB-DU. The second configuration indicates that the resource is soft. In certain embodiments, the method includes receiving a control message from a parent node. The control message includes an index to the reference signal. In various embodiments, the method includes receiving an availability indication from the parent node. The availability indication indicates whether the resource is available. In some embodiments, the method includes determining whether to perform a first operation by the IAB-MT and a second operation by the IAB-DU simultaneously based on determining that: the second transmission uses the reference signal as a source of a spatial quasi-collocation (QCL); and the availability indication indicates that the resource is available.

One apparatus for an integrated access and backhaul node configuration includes an integrated access and backhaul (IAB) node including an IAB mobile terminal (IAB-MT) and an IAB distributed unit (IAB-DU). In some embodiments, the apparatus includes a receiver that: receives a first configuration of a reference signal associated with the IAB-DU; receives a second configuration of a resource associated with the IAB-DU, wherein the second configuration indicates that the resource is soft; receives a control message from a parent node, wherein the control message includes an index to the reference signal; and receives an availability indication from the parent node. The availability indication indicates whether the resource is available. In various embodiments, the apparatus includes a processor that determines whether to perform a first operation by the IAB-MT and a second operation by the IAB-DU simultaneously based on determining that: the second transmission uses the reference signal as a source of a spatial quasi-collocation (QCL); and the availability indication indicates that the resource is available.

Another embodiment of a method for an integrated access and backhaul node configuration includes transmitting, from a parent node, a first configuration of a reference signal associated with an integrated access and backhaul (IAB) distributed unit (IAB-DU) to an IAB node. The IAB node includes an IAB mobile terminal (IAB-MT) and the IAB-DU. In some embodiments, the method includes transmitting a second configuration of a resource associated with the IAB-DU to the IAB node. The second configuration indicates that the resource is soft. In certain embodiments, the method includes transmitting a control message to the IAB node. The control message includes an index to the reference signal. In various embodiments, the method includes transmitting an availability indication to the IAB node. The availability indication indicates whether the resource is available. Whether to perform a first operation by the IAB-MT and a second operation by the IAB-DU simultaneously is determined based on determining that: the second transmission uses the reference signal as a source of a spatial quasi-collocation (QCL); and the availability indication indicates that the resource is available.

Another apparatus for an integrated access and backhaul node configuration includes a parent node. In some embodiments, the apparatus includes a transmitter that: transmits a first configuration of a reference signal associated with an integrated access and backhaul (IAB) distributed unit (IAB-DU) to an IAB node, wherein the IAB node includes an IAB mobile terminal (IAB-MT) and the IAB-DU; transmits a second configuration of a resource associated with the IAB-DU to the IAB node, wherein the second configuration indicates that the resource is soft; transmits a control message to the IAB node, wherein the control message includes an index to the reference signal; and transmits an availability indication to the IAB node. The availability indication indicates whether the resource is available. Whether to perform a first operation by the IAB-MT and a second operation by the IAB-DU simultaneously is determined based on determining that: the second transmission uses the reference signal as a source of a spatial quasi-collocation (QCL); and the availability indication indicates that the resource is available.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 6 is a schematic block diagram illustrating one embodiment of an AvailabilityCombinationsPerCell IE;

FIG. 7 is a schematic block diagram illustrating one embodiment of an AvailabilityIndicator IE;

FIG. 8 is a schematic block diagram illustrating one embodiment of ASN.1 code;

FIG. 13 is a schematic block diagram illustrating one embodiment of a configuration IE;

FIG. 14 is a schematic block diagram illustrating one embodiment of a TCI state definition;

FIG. 15 is a schematic block diagram illustrating one embodiment of an H and S configuration;

FIG. 16 is a schematic block diagram illustrating one embodiment of an H and S configuration within a TCI state configuration;

FIG. 17 is a schematic block diagram illustrating one embodiment of resource configuration;

FIG. 18 is a schematic block diagram illustrating one embodiment of a TCI state configuration;

FIG. 19 is a schematic block diagram illustrating one embodiment of an IAB node configuration;

FIG. 20 is a schematic block diagram illustrating one embodiment of a system with interface scenarios for simultaneous IAB-DU and IAB-MT operations;

FIG. 24 is a flow block diagram illustrating one embodiment of a method of a first configuration embodiment;

FIG. 25 is a flow block diagram illustrating one embodiment of a method of a first configuration embodiment;

DETAILED DESCRIPTION

Figure 1:
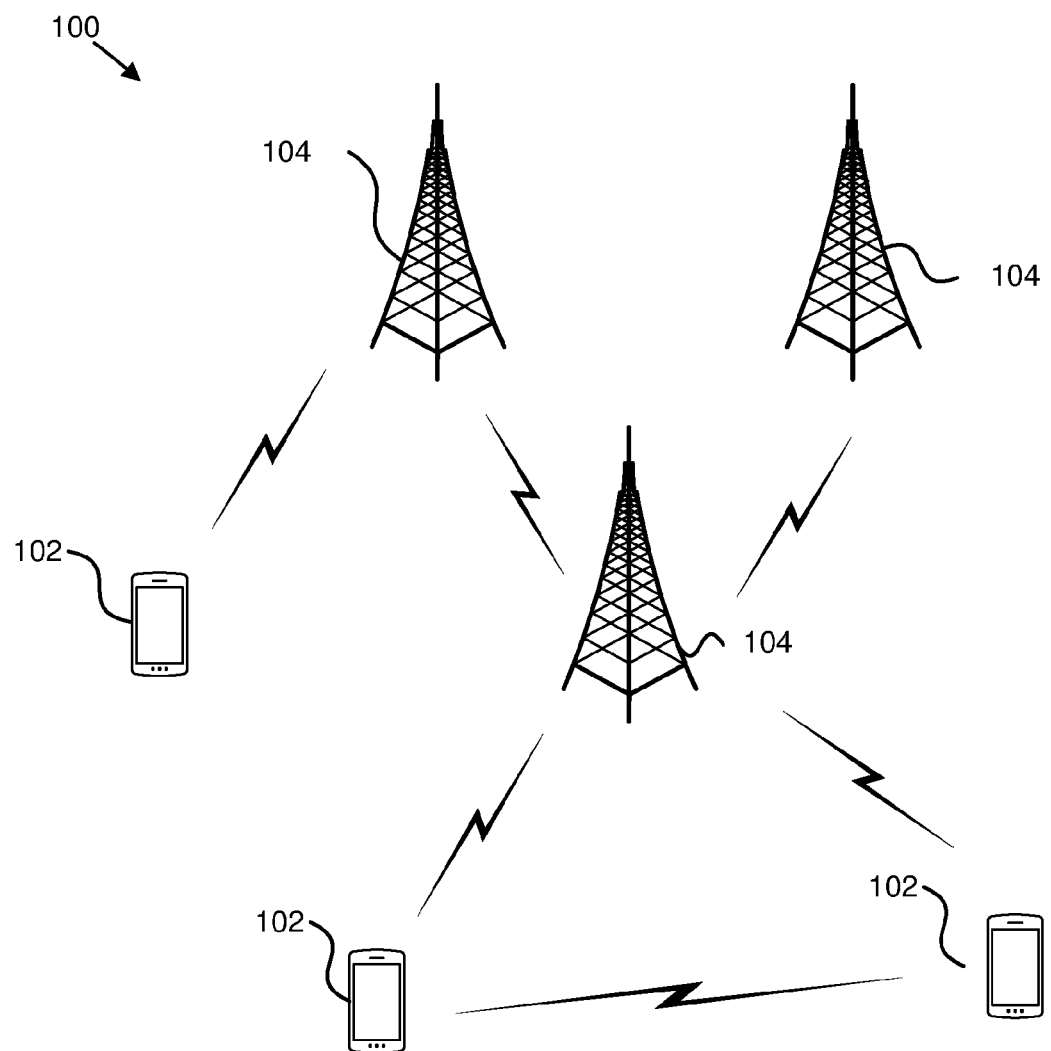
FIG. 1 is a schematic block diagram illustrating one embodiment of a wireless communication system for an integrated access and backhaul node configuration.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for an integrated access and backhaul node configuration. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may receive, at an integrated access and backhaul (IAB) node including an IAB mobile terminal (IAB-MT) and an IAB distributed unit (IAB-DU), a first configuration of a reference signal associated with the IAB-DU. In some embodiments, the network unit 104 may receive a second configuration of a resource associated with the IAB-DU. The second configuration indicates that the resource is soft. In certain embodiments, the network unit 104 may receive a control message from a parent node. The control message includes an index to the reference signal. In various embodiments, the network unit 104 may receive an availability indication from the parent node. The availability indication indicates whether the resource is available. In some embodiments, the network unit 104 may determine whether to perform a first operation by the IAB-MT and a second operation by the IAB-DU simultaneously based on determining that: the second transmission uses the reference signal as a source of a spatial quasi-collocation (QCL); and the availability indication indicates that the resource is available. Accordingly, the network unit 104 may be used for an integrated access and backhaul node configuration.

In certain embodiments, a network unit 104 may transmit, from a parent node, a first configuration of a reference signal associated with an integrated access and backhaul (IAB) distributed unit (IAB-DU) to an IAB node. The IAB node includes an IAB mobile terminal (IAB-MT) and the IAB-DU. In some embodiments, the network unit 104 may transmit a second configuration of a resource associated with the IAB-DU to the IAB node. The second configuration indicates that the resource is soft. In certain embodiments, the network unit 104 may transmit a control message to the IAB node. The control message includes an index to the reference signal. In various embodiments, the network unit 104 may transmit an availability indication to the IAB node. The availability indication indicates whether the resource is available. Whether to perform a first operation by the IAB-MT and a second operation by the IAB-DU simultaneously is determined based on determining that: the second transmission uses the reference signal as a source of a spatial quasi-collocation (QCL); and the availability indication indicates that the resource is available. Accordingly, the network unit 104 may be used for an integrated access and backhaul node configuration.

Figure 2:
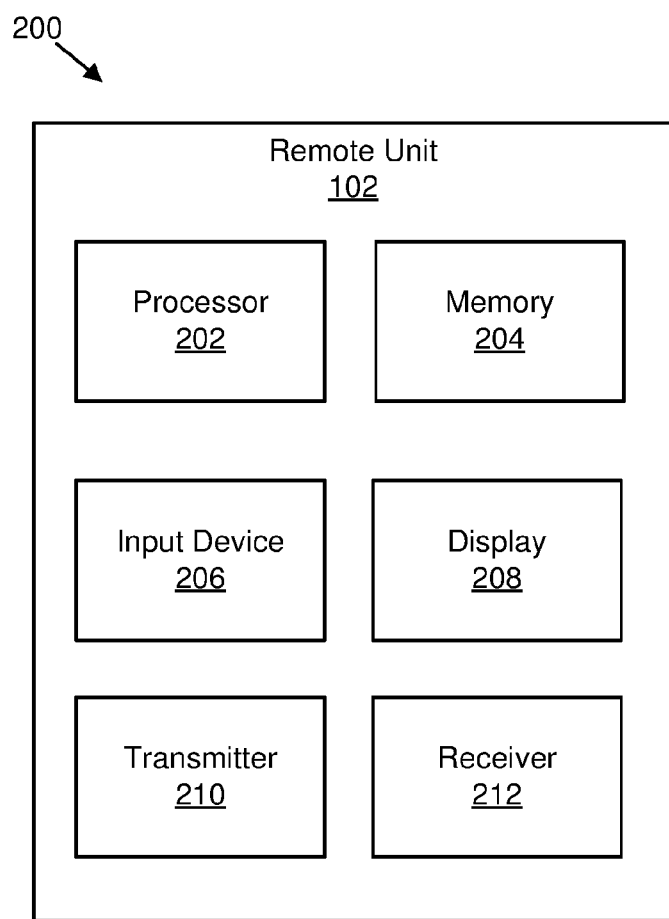
FIG. 2 is a schematic block diagram illustrating one embodiment of an apparatus that may be used for an integrated access and backhaul node configuration.

FIG. 2 depicts one embodiment of an apparatus 200 that may be used for an integrated access and backhaul node configuration. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
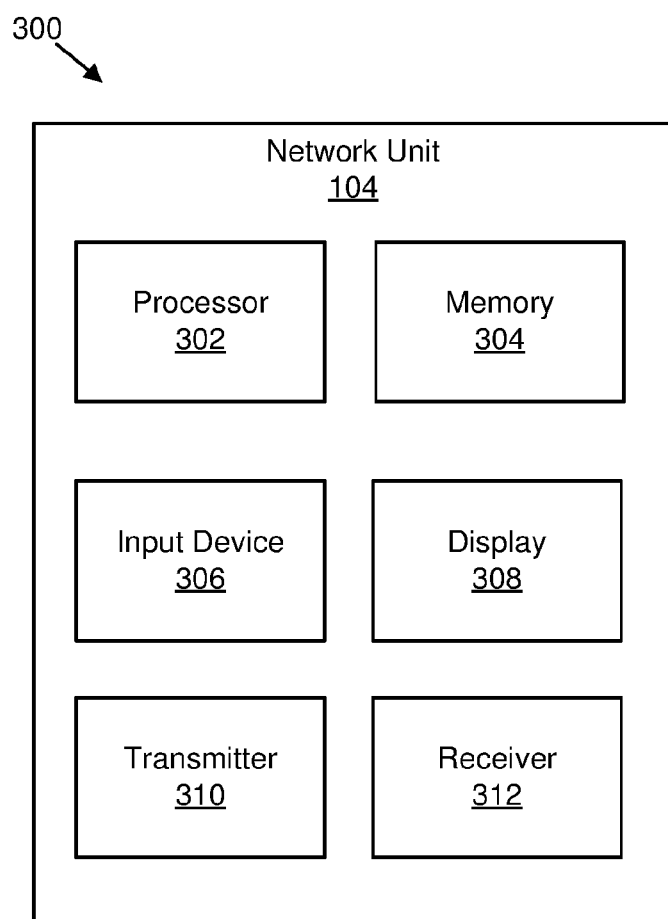
FIG. 3 is a schematic block diagram illustrating one embodiment of an apparatus that may be used for an integrated access and backhaul node configuration.

FIG. 3 depicts one embodiment of an apparatus 300 that may be used for an integrated access and backhaul node configuration. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312: receives a first configuration of a reference signal associated with the IAB-DU; receives a second configuration of a resource associated with the IAB-DU, wherein the second configuration indicates that the resource is soft; receives a control message from a parent node, wherein the control message includes an index to the reference signal; and receives an availability indication from the parent node. The availability indication indicates whether the resource is available. In various embodiments, the processor 302 determines whether to perform a first operation by the IAB-MT and a second operation by the IAB-DU simultaneously based on determining that: the second transmission uses the reference signal as a source of a spatial quasi-collocation (QCL); and the availability indication indicates that the resource is available.

In some embodiments, the transmitter 310: transmits a first configuration of a reference signal associated with an integrated access and backhaul (IAB) distributed unit (IAB-DU) to an IAB node, wherein the IAB node includes an IAB mobile terminal (IAB-MT) and the IAB-DU; transmits a second configuration of a resource associated with the IAB-DU to the IAB node, wherein the second configuration indicates that the resource is soft; transmits a control message to the IAB node, wherein the control message includes an index to the reference signal; and transmits an availability indication to the IAB node. The availability indication indicates whether the resource is available. Whether to perform a first operation by the IAB-MT and a second operation by the IAB-DU simultaneously is determined based on determining that: the second transmission uses the reference signal as a source of a spatial quasi-collocation (QCL); and the availability indication indicates that the resource is available.

It should be noted that one or more embodiments described herein may be combined into a single embodiment. In certain embodiments, integrated access and backhaul ("IAB") may be used for new radio ("NR") access technology. The IAB technology aims at increasing deployment flexibility and reducing fifth generation ("5G") rollout costs. Moreover, IAB allows service providers to reduce cell planning and spectrum planning efforts while using the wireless backhaul technology.

In some embodiments, although IAB is not limited to a specific multiplexing and duplexing scheme, it may focus is on time-division multiplexing ("TDM") between upstream communications (e.g., with a parent IAB node or IAB donor) and downstream communications (e.g., with a child IAB node or a UE).

In various embodiments, IAB system enhance resource multiplexing for supporting simultaneous operations (e.g., transmissions and/or receptions) in downstream and upstream by an IAB node includes duplexing enhancements, such as: 1) specification of enhancements to the resource multiplexing between child and parent links of an IAB node, including, a) support of simultaneous operation (e.g., transmission and/or reception) of IAB-node's child and parent links (e.g., mobile terminal ("MT") MT transmit ("TX") and distributed unit ("DU") TX, MT TX and DU receive ("RX"), MT RX and DU TX, MT RX and DU RX), and b) support for dual-connectivity scenarios defined in the context of topology redundancy for improved robustness and load balancing; and/or 2) specification of IAB-node timing modes, extensions for downlink ("DL") and/or UL power control, and command line interface ("CLI") and interference measurements of backhaul ("BH") links, as needed, to support simultaneous operation (e.g., transmission and/or reception) by IAB-node's child and parent links.

In certain embodiments, IABs at a physical layer are enhanced to perform resource multiplexing between upstream and downstream communications. Moreover, semi-static configurations for enabling simultaneous operations in upstream and downstream links in enhanced IAB nodes may be used. In such embodiments, response to changes in a system, such as topology, interference, and traffic may be slow. Furthermore, such embodiments rely on an enhanced IAB donor, while an IAB system with enhanced IAB nodes are connected to a legacy IAB donor and may not enjoy a significant performance advantage.

In some embodiments, resources are allocated and managed in time and frequency domains. Particularly, such embodiments aim at extending resource allocation and management mechanisms specified for IAB systems from the time domain to the spatial domain.

In various embodiments, communications may be multiplexed in several domains such as time, frequency, code, and spatial domains. NR systems operating at higher frequency bands such as frequency range 2 ("FR2") may rely on beamforming, also known as spatial filtering, for directing signals to specific directions (e.g., TX beamforming) or amplifying signals received from specific directions (e.g., RX beamforming). Beamforming may be in the analog domain (e.g., performed by an RF and/or analog beamformer), hence presenting the signal transmitted to or received from a direction as a separate resource in the spatial domain. Moreover, beamforming may not split the spatial domain into perfectly orthogonal parts, but nevertheless, it may provide a means to multiplex signals with sufficiently low cross-interference.

In certain embodiments, a framework of soft resource configuration and availability indication may be extended to the spatial domain. The framework may provide advantages as follows: 1) when performing enhanced duplexing methods in frequency and/or spatial domains, hardware limitations such as a number of antenna panels of the IAB node may constrain simultaneous operations in upstream and downstream—the soft resource indication framework at the spatial domain may allow a parent node of the IAB node to manage spatial resources by reserving or releasing antenna panels and/or beams of the IAB node; and 2) certain beams and/or antenna panels used by the IAB node may cause an excessive interference on the parent node—indicating availability of an interfering beam and/or antenna panel provides an additional degree of flexibility for managing spatial resources.

In some embodiments, there are several methods for configuring soft beams and indicating availability of the beams by control signaling from a parent node. Several alternatives for behavior of the parent node and the IAB node in response to configuration and control messages are also used.

Figure 4:
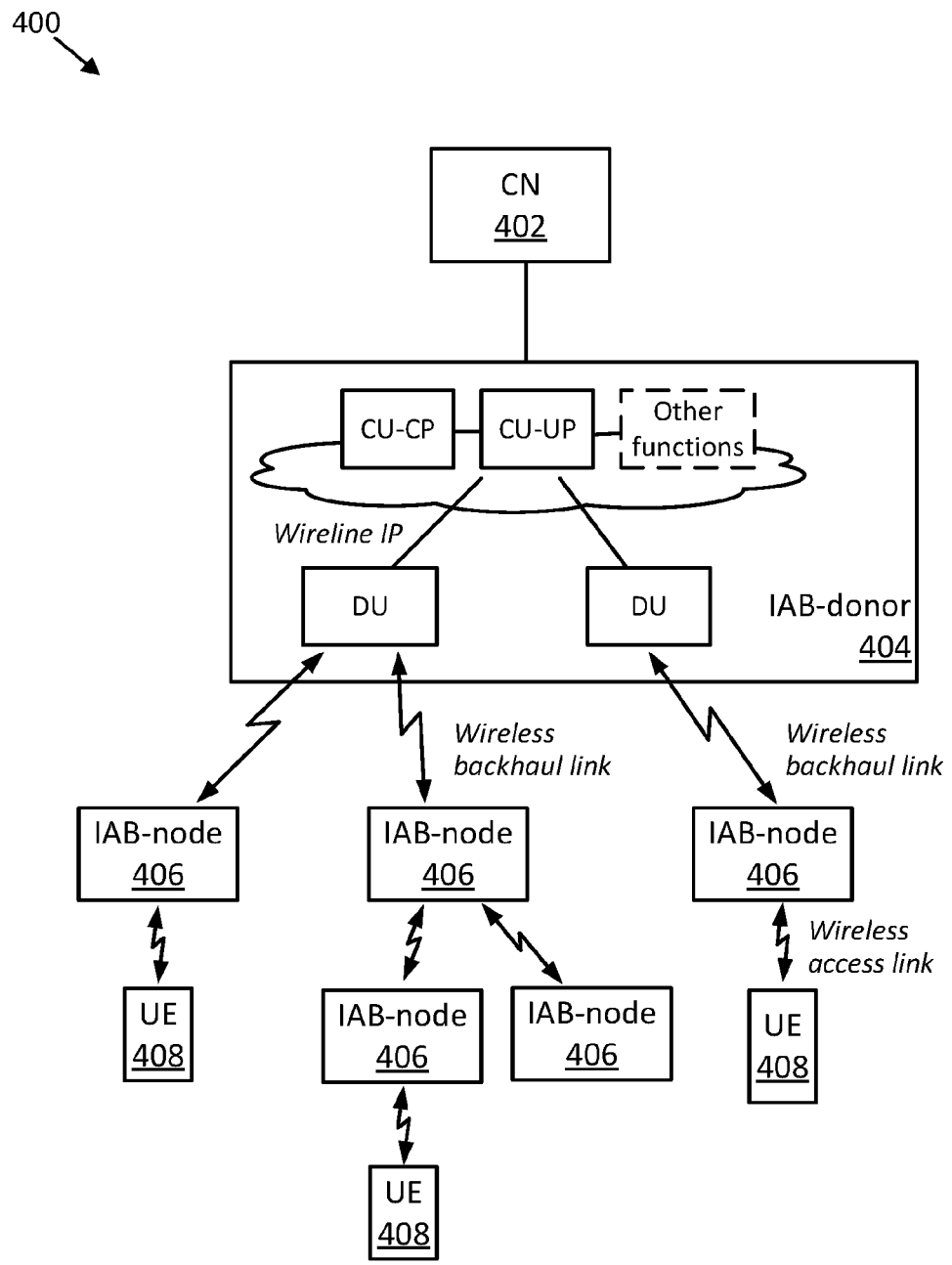
FIG. 4 is a schematic block diagram illustrating one embodiment of an IAB system in standalone mode.

FIG. 4 is a schematic block diagram illustrating one embodiment of an IAB system 400 in standalone mode. The IAB system 400 includes a core network ("CN") 402, an IAB-donor 404, IAB-nodes 406, and UEs 408. The CN 402 is connected to the IAB donor 404 of the IAB system 400 through a backhaul link, which is typically wired. The IAB donor 404 includes a central unit ("CU") that communicates with all the distributed units ("DUs") in the system through an F1* interface. The IAB donor 404 is a single logical node that may include a set of functions such as gNB-DU, gNB-CU-CP, gNB-CU-UP, and so forth. In certain deployments, the IAB donor 404 may be split according to these functions, which may all be either collocated or non-collocated. Moreover, each IAB node may be functionally split into at least a DU and a mobile terminal ("MT"). An MT of an IAB node may be connected to a DU of a parent node, which may be another IAB node or an IAB donor. A Uu link between an MT of an IAB node (called an IAB-MT) and a DU of a parent node (called an IAB-DU) is called a wireless backhaul link. In a wireless backhaul link, in terms of functionalities, the MT is similar to a UE and the DU of the parent node is similar to a base station in a conventional cellular wireless access link. Therefore, a link from an MT to a serving cell that is a DU of a parent link is called an uplink, and a link in the reverse direction is called a downlink. As used herein, embodiments may refer to an uplink or a downlink between IAB nodes, an upstream link or a downstream link of an IAB node, a link between a node and its parent node, a link between a node and its child node, and so forth without a direct reference to an IAB-MT, IAB-DU, serving cell, and so forth.

Each IAB donor or IAB node may serve UEs through access links. IAB systems may be designed to enable multi-hop communications (e.g., a UE may be connected to a core network through an access link and multiple backhaul links between IAB nodes and an IAB donor). As used herein, unless stated otherwise, an IAB node may refer to an IAB node or an IAB donor.

Figure 5:
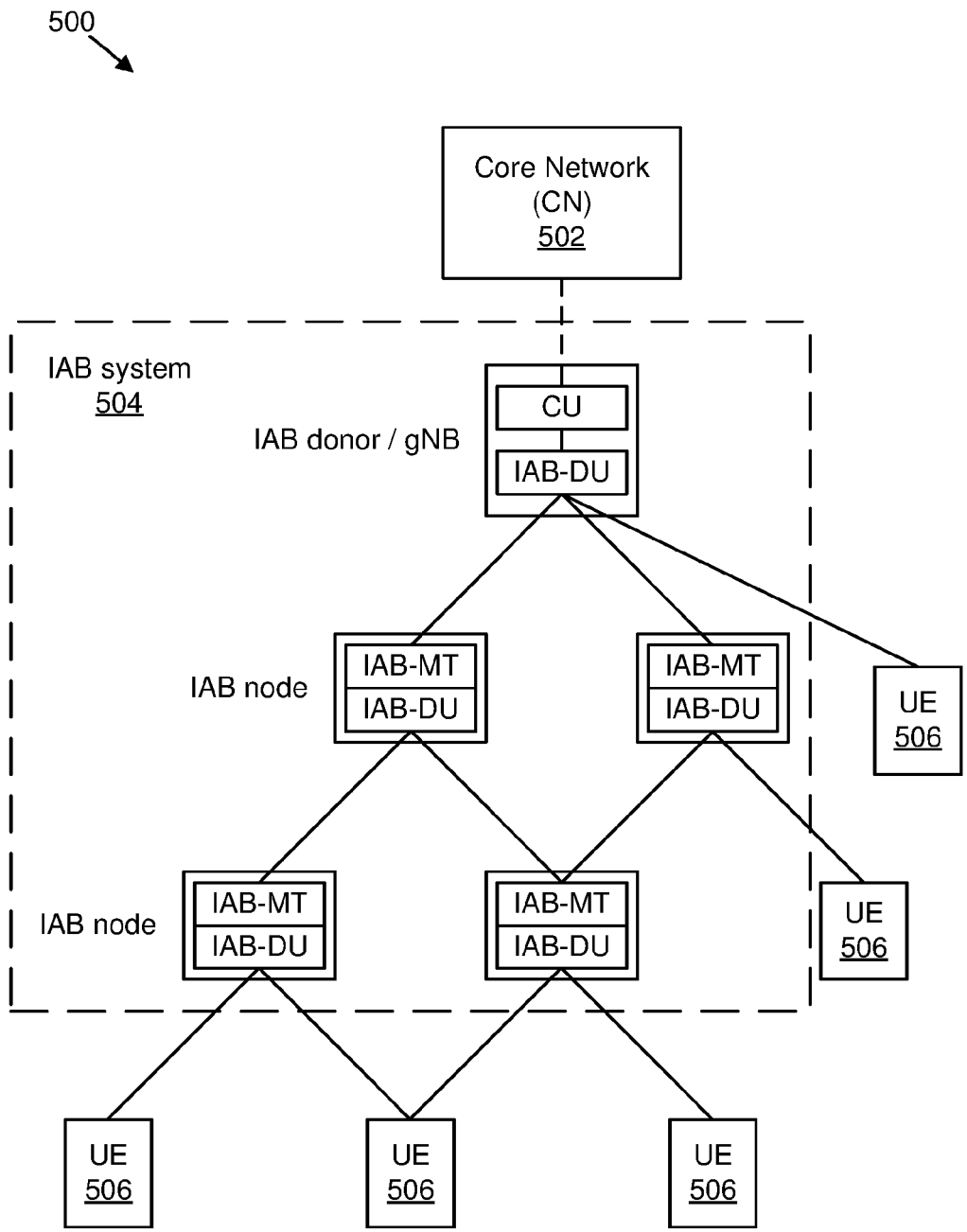
FIG. 5 is a schematic block diagram illustrating another embodiment of a system.

FIG. 5 is a schematic block diagram illustrating another embodiment of a system 500. Specifically, FIG. 5 illustrates functional splits of an IAB donor and IAB nodes. In this figure, an IAB node or a UE can be served by more than one serving cell as they support dual connectivity ("DC"). The system 500 includes a CN 502, an IAB system 504, and UEs 506. The CU and/or DU ("CU/DU") split is in an IAB donor in the IAB system 504, and the DU/MT split is in IAB nodes in the IAB system 504.

It should be noted that a node and/or link closer to the IAB donor and/or CN 502 is called an upstream node and/or link. For example, a parent node of a subject node is an upstream node of the subject node and the link to the parent node is an upstream link with respect to the subject node. Similarly, a node and/or link farther from the IAB donor and/or core network is called a downstream node and/or link. For example, a child node of a subject node is a downstream node of the subject node and the link to the child node is a downstream link with respect to the subject node.

Table 1 summarize the terminology used herein for the sake of brevity versus a description that may appear in a specification.

TABLE 1

| Phrase | Description |
| --- | --- |
| Wireless backhaul link | A connection between an MT of an IAB node and a DU of a serving cell |
| Wireless access link | A connection between a UE and (a DU of) a serving cell |
| IAB-node/IAB node | RAN node that supports NR access links to UEs and NR backhaul links to parent nodes and child nodes |
| IAB-MT | IAB-node function that terminates the Uu interface to the parent node |
| IAB-DU | gNB-DU functionality supported by the IAB-node to |

TABLE 1-continued

| Phrase | Description |
| --- | --- |
| | terminate the NR access interface to UEs and next-hop IAB-nodes, and to terminate the F1 protocol to the gNB-CU functionality on the IAB-donor |
| IAB-donor/IAB donor | gNB that provides network access to UEs via a network of backhaul and access links |
| Parent [IAB] node | An IAB node or IAB donor that comprises a serving cell of the subject node. In some examples, IAB-MT's next hop neighbour node; the parent node may be an IAB-DU of an IAB-node or an IAB-donor. |
| Child [IAB] node | An IAB node that identifies the subject node as a serving cell. In some examples, IAB-DU's next hop neighbour node; the child node is also an IAB-node. In some embodiments, a UE or an enhanced UE or an IAB-enhanced UE may perform similarly to a child IAB node. |
| Sibling [IAB] node | An IAB node that has a common parent with the subject node |
| Uplink (of a wireless backhaul link) | A link from an MT to a DU of a parent node |
| Downlink (of a wireless backhaul link) | A link from a DU to an MT of a child node |
| Upstream node/link/etc. | A node/link/etc. (topologically) closer to the IAB donor/core network. Direction toward a parent node in an IAB topology. |
| Downstream node/link/etc. | A node/link/etc. (topologically) farther from the IAB donor/core network. Direction toward a child node or UE in an IAB topology. |

In certain embodiments, an "operation" or a "communication" may refer to a transmission or a reception in an uplink (or upstream) or a downlink (or downstream). Furthermore, the terms "simultaneous operation" or "simultaneous communications" may refer to multiplexing and/or duplexing transmissions and/or receptions by a node through one or more antennas and/or panels. Simultaneous operation, if not described explicitly, may be understood from the context.

In some embodiments, with reference to slots of an IAB DU ("IAB-DU") serving cell, a symbol in a slot of an IAB-DU serving cell can be configured to be of hard, soft, or unavailable type. When a downlink, uplink, or flexible symbol is configured as hard, the IAB-DU serving cell can respectively transmit, receive, or either transmit or receive in the symbol. When a downlink, uplink, or flexible symbol is configured as soft, the IAB-DU can respectively transmit, receive or either transmit or receive in the symbol only if: 1) the IAB MT ("IAB-MT") does not transmit or receive in the symbol; 2) the IAB-MT would transmit or receive in the symbol, and the transmission or reception in the symbol is not changed due to a use of the symbol by the IAB-DU; or 3) the IAB-MT detects a downlink control information ("DCI") format 2_5 with an availability indicator ("AI") index field value indicating the soft symbol as available.

In various embodiments, if a symbol is configured as unavailable, the IAB-DU neither transmits nor receives in the symbol. A symbol of a slot is equivalent to being configured as hard if an IAB-DU would transmit a synchronization signal ("SS") and/or physical broadcast channel ("PBCH") ("SS/PBCH") block, physical downlink control channel ("PDCCH") for Type0-PDCCH common search space ("CSS") sets configured by pdcchConfigSIB1, or a periodic channel state information ("CSI") reference signal ("RS") ("CSI-RS") in the symbol of the slot, or would receive a physical random access channel ("PRACH") or a SR in the symbol of the slot.

In certain embodiments, if an IAB-node is provided an AvailabilityIndicator, the IAB-node is provided an AI radio network temporary identifier ("RNTI") ("AI-RNTI") by ai-RNTI and a payload size of a DCI format 25 by dci-PayloadSize-AI. The IAB-node is also provided a search space set configuration, by SearchSpace, for monitoring PDCCH.

In some embodiments, for each serving cell of an IAB-DU in a set of serving cells of the IAB-DU, the IAB-DU can be provided: 1) an identity of the IAB-DU serving cell by iabDuCellId-AI; 2) a location of an AI index field in DCI format 2_5 by positionInDCI-AI; 3) a set of availability combinations by availabilityCombinations, where each availability combination in the set of availability combinations includes, a) resourceAvailability indicating availability of soft symbols in one or more slots for the IAB-DU serving cell, and b) a mapping for the soft symbol availability combinations provided by resourceAvailability to a corresponding AI index field value in DCI format 2_5 provided by availabilityCombinationId.

In various embodiments, an IAB-DU can assume a same subcarrier spacing ("SCS") configuration for availability-Combinations for a serving cell as an SCS configuration provided by IAB-DU-Resource-Configuration-TDD-Config for the serving cell.

In certain embodiments, an AI index field value in a DCI format 2_5 indicates to an IAB-DU a soft symbol availability in each slot for a number of slots starting from the earliest slot of the IAB-DU which overlaps in time with the slot of the IAB-MT where the IAB-MT detects the DCI format 2_5. The number of slots is equal to or larger than a PDCCH monitoring periodicity for DCI format 2_5 as provided by SearchSpace. The AI index field includes max{⌈log$_2$(maxAIindex+1)⌉,1} bits where maxAIindex is the maximum of the values provided by corresponding availabilityCombinationId. An availability for a soft symbol in a slot is identified by a corresponding value resourceAvailability as provided in Table 2.

TABLE 2

Mapping between values of resourceAvailability elements and types of soft symbol availability in a slot

| Value | Indication |
| --- | --- |
| 0 | No indication of availability for soft symbols |
| 1 | DL soft symbols are indicated available<br>No indication of availability for UL and Flexible soft symbols |
| 2 | UL soft symbols are indicated available<br>No indication of availability for DL and Flexible soft symbols |
| 3 | DL and UL soft symbols are indicated available<br>No indication of availability for Flexible soft symbols |
| 4 | Flexible soft symbols are indicated available<br>No indication of availability for DL and UL soft symbols |
| 5 | DL and Flexible soft symbols are indicated available<br>No indication of availability for UL soft symbols |
| 6 | UL and Flexible soft symbols are indicated available<br>No indication of availability for DL soft symbols |
| 7 | DL, UL, and Flexible soft symbols are indicated available |

In some embodiments, if a PDCCH monitoring periodicity for DCI format 2_5 is smaller than a duration of an availability combination of soft symbols over a number of slots that the IAB-MT obtains at a PDCCH monitoring occasion for DCI format 2_5 by a corresponding AI index field value, and the IAB-MT detects more than one DCI formats 2_5 indicating an availability combination of soft symbols in a slot, the IAB-MT expects that each of the more than one DCI formats 2_5 indicates a same value for the availability combination of the soft symbols in the slot.

In various embodiments, an information element ("IE") AvailabiltyCombinationsPerCell is used to configure the AvailabiltyCombinations applicable for a serving cell of the IAB-node DU.

FIG. 6 is a schematic block diagram illustrating one embodiment of an AvailabilityCombinationsPerCell IE 600 with definitions per Tables 3 and 4.

TABLE 3

| AvailabilityCombination field descriptions |
|---|
| resourceAvailability |
| Indicates the resource availability of soft symbols for a set of consecutive slots in the time domain. The meaning of this field is described in TS 38.213 [13], Table 14.3. |
| availabiltyCombinationId |
| This ID is used in the DCI Format 2_5 payload to dynamically select this AvailabilityCombination, see TS 38.213 [13], clause 14. |

TABLE 4

| AvailabilityCombinationsPerCell field descriptions |
|---|
| iab-DU-CellIdentity |
| The ID of the IAB-DU cell for which the availabilityCombinations are applicable. |

TABLE 4-continued

| AvailabilityCombinationsPerCell field descriptions |
|---|
| positionInDC-AI |
| The (starting) position (bit) of the AvailabilityCombinationId for the indicated IAB-DU cell (iab-DU-CellIdentity) within the DCI payload. |

In certain embodiments, an AvailabilityIndicator IE is used to configure monitoring a PDCCH for AIs.

FIG. 7 is a schematic block diagram illustrating one embodiment of an AvailabilityIndicator IE 700 with definitions per Table 5.

TABLE 5

| AvailabilityIndicator field descriptions |
|---|
| ai-RNTI |
| Used by an IAB-MT for detection of DCI format 2_5 indicating AvailabilityCombinationId for an IAB-DU's cells. |
| availableCombToAddModList |
| A list of availabilityCombinations to add for the IAB-DU's cells. (see TS 38.213 [13], clause 14). |
| availableCombToReleaseList |
| A list of availabilityCombinations to release for the IAB-DU's cells. (see TS 38.213 [13], clause 14). |
| dci-PayloadSizeAI |
| Total length of the DCI payload scrambled with ai-RNTI (see TS 38.213 [13]). |

In some embodiments, there may be a gNB DU ("gNB-DU") cell resource configuration in which an IE contains the resource configuration of the cells served by a gNB-DU (e.g., the time division duplexing ("TDD") and/or frequency division duplexing ("FDD") resource parameters for each activated cell), as shown in Table 6.

TABLE 6

| IE/Group Name | Presence | Range | IE type and reference | Semantics description | Criticality | Assigned Criticality |
|---|---|---|---|---|---|---|
| Subcarrier Spacing | M | | ENUMERATED (kHz15, kHz30, kHz60, kHz120, kHz240, spare3, spare2, spare1, . . .) | Subcarrier spacing used as reference for the TDD/FDD slot configuration. | YES | reject |
| DUF Transmission Periodicity | O | | ENUMERATED (ms0p5, ms0p625, ms1, ms1p25, ms2, ms2p5, ms5, ms10, . . .) | | YES | reject |
| DUF Slot Configuration List | | 0 . . . 1 | | | | |
| >DUF Slot Configuration Item | | 1 . . . <maxnoofDUFSlots> | | The maxNrofSlots in TS 38.331 [8]. | | — |
| >>CHOICE DUF Slot Configuration | M | | | | | — |
| >>>Explicit Format | | | | | | — |
| >>>>Permutation | M | | ENUMERATED (DFU, UFD, . . .) | | | — |
| >>>>Number of Downlink Symbols | O | | INTEGER (0 . . . 14) | | | |
| >>>>Number of | O | | INTEGER | | | |

TABLE 6-continued

| IE/Group Name | Presence | Range | IE type and reference | Semantics description | Criticality | Assigned Criticality |
|---|---|---|---|---|---|---|
| Uplink Symbols >>>Implicit Format | | | (0 . . . 14) | | | |
| >>>>DUF Slot Format Index | M | | INTEGER (0 . . . 254) | Index into Table 11.1.1-x and Table 14-1 in TS 38.213 [31], excluding the last row. | — | |
| HSNA Transmission Periodicity | M | | ENUMERATED (ms0p5, ms0p625, ms1, ms1p25, ms2, ms2p5, ms5, ms10, ms20, ms40, ms80, ms160, . . .) | | YES | reject |
| HSNA Slot Configuration List | | 0 . . . 1 | | | | |
| >HSNA Slot Configuration Item | | 1 . . . <maxnoofHSNASlots> | | | | |
| >>HSNA Downlink | O | | ENUMERATED (HARD, SOFT, NOTAVAILABLE) | HSNA value for downlink symbols in a slot. | — | |
| >>HSNA Uplink | O | | ENUMERATED (HARD, SOFT, NOTAVAILABLE) | HSNA value for uplink symbols in a slot. | — | |
| >>HSNA Flexible | O | | ENUMERATED (HARD, SOFT, NOTAVAILABLE) | HSNA value for flexible symbols in a slot. | — | |

TABLE 7

| Range bound | Explanation |
|---|---|
| maxnoofDUFSlots | Maximum no. of slots in 10 ms. Value is 320. |
| maxnoofSymbols | Maximum no. of symbols in a slot. Value is 14. |
| maxnoofHSNASlots | Maximum no of "Hard", "Soft" or "Not available" slots in 160 ms. Value is 5120. |

FIG. 8 is a schematic block diagram illustrating one embodiment of abstract syntax notation 1 ("ASN.1") code 800.

In various embodiments, except for specifications for timing alignment, inter-node discovery and measurements, resource allocation enhancements, and a few other features, a wireless backhaul link at the physical layer is similar to a conventional access link.

In certain embodiments, procedures for beam management for a UE in a radio resource control ("RRC") connected ("RRC_CONNECTED") mode include: 1) beam acquisition and maintenance; 2) beam indication; and/or 3) beam failure recovery.

In some embodiments, following a beam-based initial access that allows a UE to establish an RRC connection with a gNB, the gNB can configure beam acquisition and maintenance procedures through RRC signaling for the UE.

In various embodiments, a UE can be configured with M resource settings, each configured through a CSI-ResourceConfig IE, and N reporting settings, each configured through a CSI-ReportConfig IE. The UE is expected to perform measurements on the reference signals (e.g., CSI-RS or SS/PBCH blocks) transmitted by the gNB on the configured resources indicated by field of type CSI-ResourceConfigId in a reporting setting to produce the associated report. The timing of producing and transmitting a report is controlled by the network through physical layer, medium access control ("MAC") layer, and/or RRC signaling—a periodic report is produced and transmitted as configured by the RRC; a semi-persistent report is activated and/or deactivated by MAC signaling; and an aperiodic report requires a triggering by a DCI message. Next, if the gNB intends to indicate a beam for communications, it uses a transmission configuration indication ("TCI") parameter, which indicates a quasi-collocation ("QCL") between a reference signal resource (e.g., a CSI-RS resource or an SS/PBCH block resource) and a demodulation ("DM") reference signal ("RS") ("DM-RS") of the upcoming communication. A QCL indication of "Type D" indicates that the UE is expected to use the same beams it has used for receiving and/or transmitting the reference signal to receive and/or transmit the upcoming communication.

Figure 9:
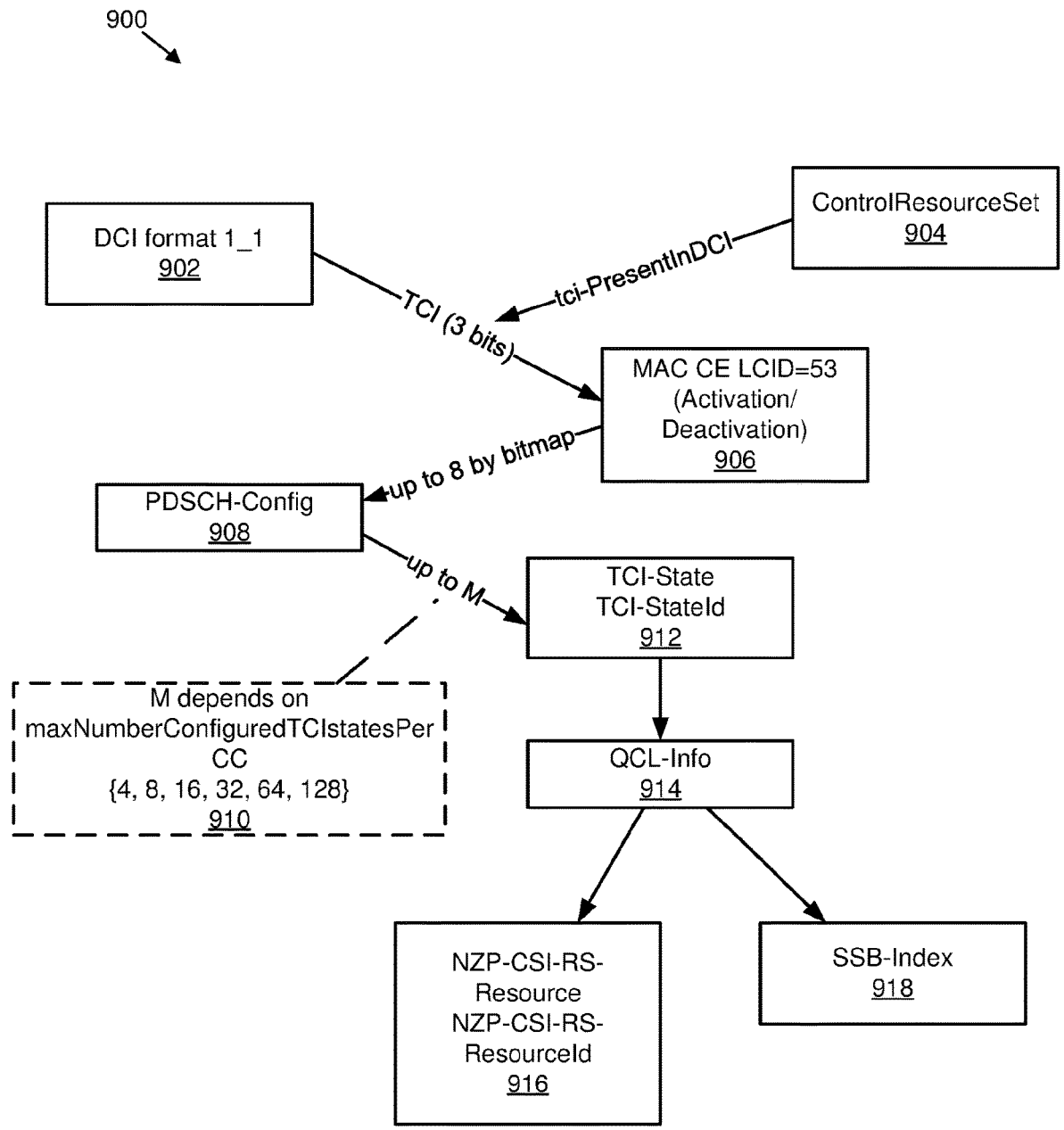
FIG. 9 is a schematic block diagram illustrating one embodiment of a method for QCL indication in NR.

FIG. 9 illustrates how DCI format 1_1 indicates QCL to a CSI-RS resource identifier ("ID") or a synchronization signal block ("SSB") index.

FIG. 9 is a schematic block diagram illustrating one embodiment of a method 900 for QCL indication in NR. A DCI format 1_1 902 transmits TCI (e.g., 3 bits) and a ControlResourceSet 904 transmits tci-PresentInDCI for MAC control element ("CE") logical channel identifier ("LCID")=53 906 (e.g., activation and/or deactivation) which transfers up to 8 by bitmap. A PDSCH-Config 908 transmits up to M, where M depends on maxNumberConfiguredTCIstatesPer component carrier ("CC") {4, 8, 16, 32, 64, 128} 910, to TCI-State TCI-StateId 912 which transmits to QCL-Infor 914 which outputs to NZP-CSI-RS-Resource NZP-CSI-RS-ResourceId 916 and SSB-Index 918.

In certain embodiments, beam failure recovery is specified to allow a user equipment ("UE") to recover from beam failure and continue communications on newly established beam pairs. In some embodiments, a framework is reused for beam management between fixed and/or parent IAB nodes and/or donors and mobile and/or child IAB nodes.

In some embodiments, dynamic TDD is used in NR through RRC configurations and lower layer control signaling. It allows NR systems to enjoy more flexible slot formats for TDD operation that can be modified dynamically for adaptation to varying traffic. RRC can configure slots for TDD operation by the following IEs: 1) TDD-UL-DL-ConfigCommon: this IE determines a cell-specific uplink and/or downlink TDD configuration—the IE contains a periodicity value between 0.5 ms to 10 ms and a reference SCS—a slot configuration pattern (e.g., through one or two pattern fields) are then defined within the periodicity—the periodicity may contain multiple slots—the most general pattern for each periodicity is a number of downlink slots and symbols at the beginning and a number of uplink symbols and slots at the end—all the remaining slots and/or symbols in between are flexible and can be overridden by the following UE-specific configuration; 2) TDD-UL-DL-ConfigDedicated: this IE determines a UE-specific uplink and/or downlink TDD configuration—the IE configures a number of slot configurations—each slots configuration contains an index based on the periodicity defined by the cell-specific configuration, and a number of downlink and uplink symbols in the slot, which can override flexible symbols configured by the cell-specific configuration.

In various embodiments, resources that are still flexible (e.g., not configured for downlink or uplink) by the cell-specific or UE-specific configuration can be dynamically indicated downlink or uplink by a DCI format 2_0 for a UE or a group of UEs. The DCI can contain slot format indicators ("SFIs"), an index to a table of slot formats can be configured by the RRC. The configuration from the RRC refers to each slot format by an 8-bit number.

In certain embodiments, 56 of the 256 possible values (e.g., indexed 0-55) are used to define slot formats of various combinations. The general format for each of the slot formats is DL-F-UL, where a slot format may contain one, two, or all the three types of the symbols with various numbers in the specified order. In some embodiments, 41 more values (e.g., indexed 56-96) are used for UL-F-DL formats for IAB that provide further flexibility for an IAB node that may want to start a slot with uplink symbols followed by downlink symbols. Resources that are not configured or indicated downlink or uplink by any of the above signaling should be assumed reserved, which allows flexibility for cell management, coexistence, and so forth.

Furthermore, in some embodiments, resources may be configured as hard ("H"), soft ("S"), or not available ("NA"). Hard resources may be assumed available for scheduling by an IAB node and NA resources may not be assumed available, while soft resources may be indicated available or not available dynamically. A dynamic availability indication ("AI") for soft resources may be performed by DCI format 2_5 from a parent IAB node and/or donor, and may have similarities in formats and definitions with SFI (e.g., DCI format 2_0).

In various embodiments, resources may be shared between backhaul and access links, which may be configured semi-statically by a CU (e.g., IAB donor at layer-3) or dynamically by DU (e.g., parent IAB node at layer-1). Multiplexing between backhaul link and access link resources may be TDM, frequency division multiplexing ("FDM"), or may allow time-frequency resource sharing. Furthermore, resources may be allocated exactly (e.g., per node or per link) or in the form of a resource pool.

In certain embodiments, semi-static configuration at layer-2 or layer-3 may be allowed for sharing resources between backhaul and access. It should be noted that an emphasis may be on configuration of resources for backhaul verses access rather than upstream verses downstream. However, under dynamic scheduling, an IAB node can use resources not used by the parent IAB node for backhaul to schedule the access link.

In some embodiments, semi-static verses dynamic resource coordination may be used. In various embodiments, flexible ("F") may be used in DCI 2_0 and a state access ("A") for determining slot format and sharing resources may use an access link.

The DCI formats may be as shown in Table 8.

TABLE 8

| DCI format | Usage |
| --- | --- |
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside discontinuous reception ("DRX") Active Time for one or more UEs |
| 3_0 | Scheduling of NR sidelink in one cell |
| 3_1 | Scheduling of LTE sidelink in one cell |

It should be noted that, as used herein, a DCI message scheduling a physical uplink shared channel ("PUSCH") may refer to a DCI format 0_0, 0_1, or 0_2; a DCI message scheduling a PDSCH may refer to a DCI format 1_0, 1_1, or 1_2; an SFI message may refer to a DCI format 2_0; and an AI message may refer to a DC format 2_5.

In certain embodiments, an IAB system may be connected to a core network through one or more IAB donors. Further, each IAB node may be connected to an IAB donor and/or other IAB nodes through wireless backhaul links. Each IAB donor and/or node may also serve UEs.

Figure 10:
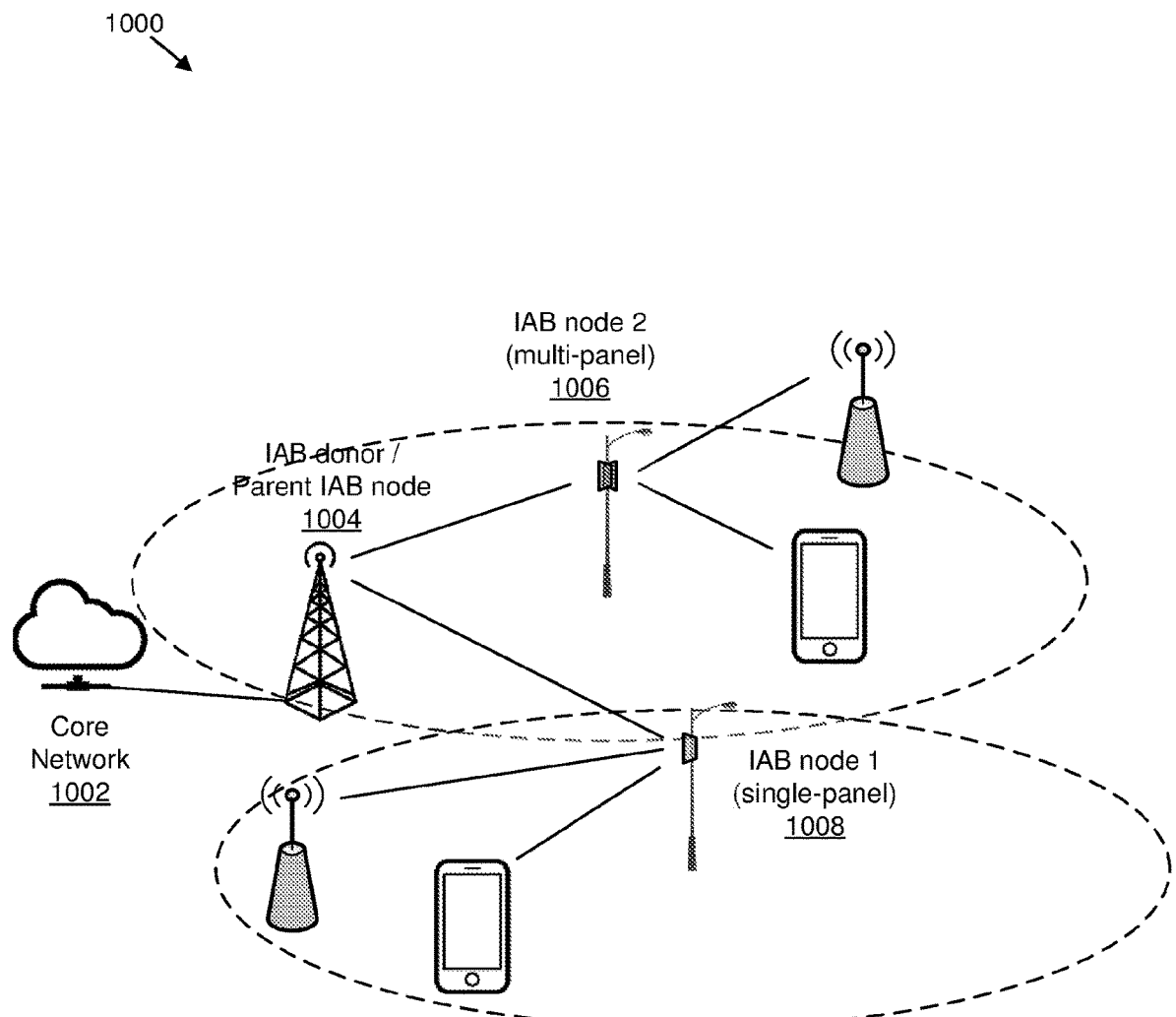
FIG. 10 is a schematic block diagram illustrating one embodiment of an IAB system with single-panel and multi-panel IAB nodes.

FIG. 10 is a schematic block diagram illustrating one embodiment of an IAB system 1000 with single-panel and multi-panel IAB nodes. The IAB system 1000 includes a core network 1002, an IAB donor and/or parent IAB node 1004, an IAB node 2 (e.g., multi-panel) 1006, and an IAB node 1 (e.g., single-panel) 1008.

There are various options with regards to the structure and multiplexing and/or duplexing capabilities of an IAB node. For example, each IAB node may have one or may antenna panels, each connected to the baseband unit through a radio frequency ("RF") chain. The one or may antenna panels may be able to serve a wide spatial area of interest in a vicinity of the IAB node, or otherwise each antenna panel or each group of antenna panels may provide a partial coverage such as a "sector." An IAB node with multiple antenna panels, each serving a separate spatial area or sector, may still be referred to as a single-panel IAB node as it behaves similarly to a single-panel IAB node for communications in each of the separate spatial areas or sectors.

In some embodiments, each antenna panel may be half-duplex ("HD"), meaning that it is able to either transmit or receive signals in a frequency band at a time, or full-duplex ("FD"), meaning that it is able to both transmit and receive signals in a frequency band simultaneously. Unlike full-duplex radio, half-duplex radio is widely implemented and used in practice and may be assumed to be a default mode of operation in wireless systems.

Table 9 lists different duplexing scenarios of interest if multiplexing is not constrained to time-division multiplexing ("TDM"). In table 4, single-panel and multi-panel IAB nodes are considered for different cases of simultaneous transmission and/or reception. Spatial-division multiplexing ("SDM") may refer to either transmission or reception on downlink (or downstream) and uplink (or upstream) simultaneously; full duplex ("FD") may refer to simultaneous transmission and reception by a same antenna panel in a frequency band; and multi-panel transmission and reception ("MPTR") may refer to simultaneous transmission and/or reception by multiple antenna panels where each antenna panel either transmits or receives in a frequency band at a time.

TABLE 9

| Case# | Architecture/ Capability | Simultaneous TX/RX Type | IAB-MT | IAB-DU | Scenario# |
|---|---|---|---|---|---|
| Case A/ | Single-panel | TX SDM | UL-TX | DL-TX | S3 |
| Case#1 | Multi-panel | TX MPTR/SDM | UL-TX | DL-TX | S7 |
| Case B/ | Single-panel | RX SDM | DL-RX | UL-RX | S1 |
| Case#2 | Multi-panel | RX MPTR/SDM | DL-RX | UL-RX | S5 |
| Case C/ | Single-panel | UL FD | UL-TX | UL-RX | S4 |
| Case#3 | Multi-panel | UL MPTR/FD | UL-TX | UL-RX | S8 |
| Case D/ | Single-panel | DL FD | DL-RX | DL-TX | S2 |
| Case#4 | Multi-panel | DL MPTR/FD | DL-RX | DL-TX | S6 |

Figure 11:
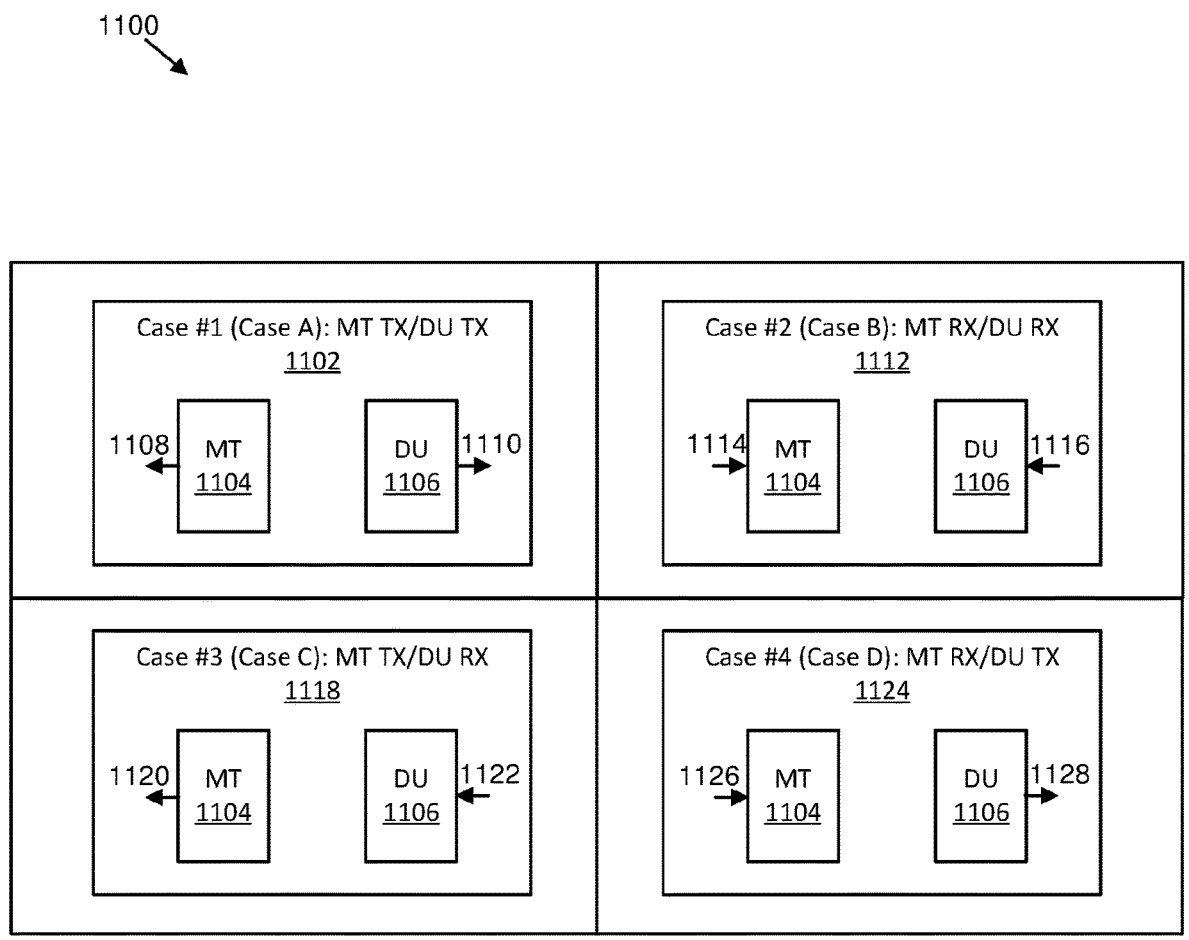
FIG. 11 is a schematic block diagram illustrating one embodiment of types of simultaneous transmission and/or reception operations.

In Table 9, based on a type of simultaneous operations and a number of panels in an IAB node, the scenarios are called S1, S2, . . . , S8, while the "Case" numbers (e.g., A/B/C/D or 1/2/3/4) may be in accordance with FIG. 11.

FIG. 11 is a schematic block diagram 1100 illustrating one embodiment of types of simultaneous transmission and/or reception operations. The diagram 1100 illustrates a first case 1102 (e.g., Case #1, Case A, MT TX and DU TX) having an MT 1104 and a DU 1106, in which the MT 1104 transmits 1108 and the DU 1106 transmits 1110. Moreover, the diagram 1100 illustrates a second case 1112 (e.g., Case #2, Case B, MT RX and DU RX) having the MT 1104 and the DU 1106, in which the MT 1104 receives 1114 and the DU 1106 receives 1116. Further, the diagram 1100 illustrates a third case 1118 (e.g., Case #3, Case C, MT TX and DU RX) having the MT 1104 and the DU 1106, in which the MT 1104 transmits 1120 and the DU 1106 receives 1122. The diagram 1100 illustrates a fourth case 1124 (e.g., Case #4, Case D, MT RX and DU TX) having the MT 1104 and the DU 1106, in which the MT 1104 receives 1126 and the DU 1106 transmits 1128. As used herein, different cases may be referred to by the case #, case letter, or description as found in FIG. 11.

In certain embodiments, multi-hop IAB may be used.

Figure 12:
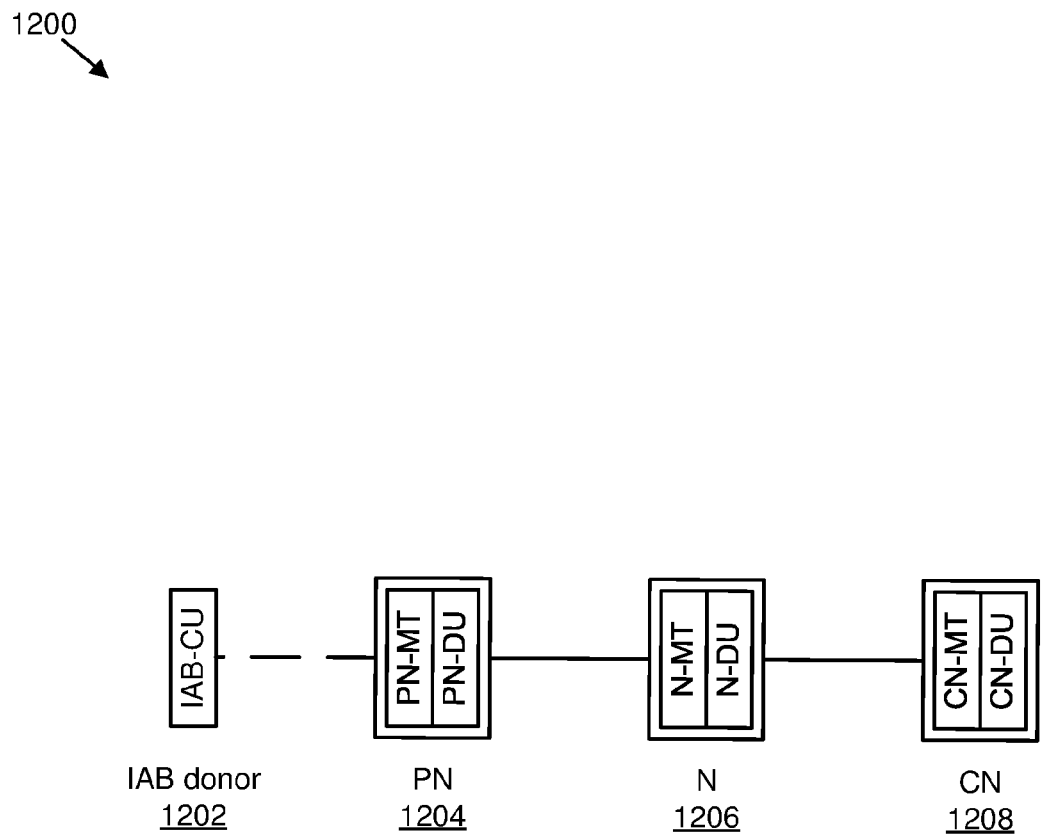
FIG. 12 is a schematic block diagram illustrating one embodiment of a system including a multi-hop IAB scenario.

FIG. 12 is a schematic block diagram illustrating one embodiment of a system 1200 including a multi-hop IAB scenario. The system 1200 includes an IAB donor 1202 (e.g., IAB central unit ("CU") ("IAB-CU")), a parent node ("PN") 1204 (e.g., PN MT ("PN-MT"), PN DU ("PN-DU")), a node ("N") 1206 (e.g., N MT ("N-MT"), N DU ("N-DU")), and a core network ("CN") 1208 (e.g., CN MT ("CN-MT"), CN DU ("CN-DU")).

In a first embodiment, an IAB-CU may configure a plurality of TCI states (e.g., TCI-State IEs) for CN-MT. The IAB-CU may also configure a PDSCH (e.g., PDSCH-Config IE) for CN-MT, which includes IDs of a maximum of M of the TCI states. A MAC-CE message (e.g. with LCID=53), may then activate up to 8 of the M TCI states by a bitmap. Finally, 3 bits in DCI 1_1 may indicate a TCI state from the activated TCI states. IAB-CU may also configure one or more control resource sets ("CORESETs"), each with a corresponding TCI state.

In some embodiments, an IAB-CU may configure each of the plurality of TC states as H, S, or NA. A configuration IE may be defined as in FIG. 13. Specifically, FIG. 13 is a schematic block diagram illustrating one embodiment of a configuration IE 1300.

In various embodiments, a configuration may assign attributes to any of the M TCI states indicated by a PDSCH configuration and/or by a PDCCH and/or CORESET configuration. In such embodiments, a configuration may be included in a PDSCH configuration.

In certain embodiments, for configuring H, S, and NA attributes for a TCI state, an optional attribute may be added in the definition of the TCI state, for example, an hna field as shown in FIG. 14. Specifically, FIG. 14 is a schematic block diagram illustrating one embodiment of a TCI state definition 1400.

In some embodiments, a TCI state that has not been configured with an H, S, and/or NA attribute may be assumed to have a default attribute such as H, S, or NA, which may be determined by a standard or by a configuration. In various embodiments, a default attribute for a TCI state may be H. In certain embodiments, a default attribute for a TC state may be S (e.g., any TCI state configuration may be followed by availability indication signaling from a parent node).

In various embodiments, due to intrinsic differences between resources in the time-frequency domain and the spatial domain, the attribute NA (e.g., not-available or unavailable) may be redundant. For example, a TCI state with an NA attribute may simply not be configured by the IAB-CU or deactivated by a parent node. Therefore, in certain embodiments, only H and S attributes may be configured for a TCT state, such as in FIGS. 15 and 16.

FIG. 15 is a schematic block diagram illustrating one embodiment of an H and S configuration 1500. FIG. 16 is a schematic block diagram illustrating one embodiment of an H and S configuration within a TCI state configuration 1600.

In certain embodiments, since TCI states and corresponding H, S, and/or NA ("H/S/NA") attributes are configured for CN-MT, a replicate of the configurations may be sent to N by the IAB-CU. This may be reflected in a standard. In some embodiments, an IAB node may be informed of TCI state configurations and H/S/NA attributes configured for a child node. In various embodiments, H/S/NA attribute information may only be sent to a parent node, not the IAB node.

In various embodiments, once configurations are sent to N and/or CN, an IAB node N may indicate a TCI state, via N-DU signaling to CN-MT, for scheduling a downlink channel such as a physical downlink shared channel ("PDSCH") as follows. Here, the IAB-DU and the IAB-MT are part of the IAB node N. For a downlink transmission by the IAB-DU of N to CN: 1) if a TCI state is configured as hard, the TCI state may be used for a downlink transmission; 2) if a TCI state is configured as soft, the TCI state may be used for a downlink transmission only if a) the IAB-MT does not transmit or receive, b) the IAB-MT would transmit or receive, and the transmission or reception is not changed due to a use of the TCI state by the IAB-DU, or c) the IAB-MT detects an availability indication or other control signaling with a field value indicating the soft TCI state as available; and/or 3) if a TCI state is configured as unavailable, the TCI state may not be used for a downlink transmission.

In certain embodiments, rules do not allow a PN to indicate to an IAB node N that a TCI state is strictly unavailable. Instead, they only allow the PN to warn N that there may be communications by the IAB-MT conflicting with a use of a TC state by the IAB-DU, but the TCI state may still be used if an implementation of N allows a simultaneous communication between the IAB-MT and the IAB-DU.

However, in some embodiments, such as interference management scenarios, PN may need to indicate to N that a TCI state "shall" not be used. For example, consider Case A multiplexing where N transmits to PN and CN simultaneously. If PN performs an RX beamforming towards an IAB-MT antenna of N to receive an uplink signal, a downlink signal from an IAB-DU antenna of N to CN on a certain TX beam may cause an excessive interference on PN. Therefore, having performed interference measurements, PN may need to indicate to N that the TX beam (e.g., TCI state) is not available to N for IAB-DU transmission, and that is even if an implementation of N may allow it to use the TX beam (e.g., TCI state) without changing an IAB-MT behavior.

In various embodiments, other rules may be used for TCI states. In certain embodiments, additional values may be indicated for determining availability of a soft resource. The abbreviations IA (e.g., is available) and INA (e.g., is not available) are used herein for availability of a soft TCI state.

In some embodiments, for IA1: if this value is indicated for a soft TCI state, the TCI state is available to N unconditionally. This is similar to a value of '1' in an AI of a soft symbol in a time domain.

In various embodiments, for IA2: if this value is indicated for a soft TCI state, the TCI state is available to N only if it does not change an IAB-MT operation. This is similar to conditional availability indication ("CAI") for a frequency domain.

In certain embodiments, for INA1: if this value is indicated for a soft TCI state, the TCI state is unavailable to N unless an implementation of N allows N to use the TCI state simultaneously with another operation, for example, an IAB-MT operation. This is similar to a value of '0' in an AI of a soft symbol in the time domain.

In some embodiments, for INA2: if this value is indicated for a soft TCI state, the TCI state is unavailable to N unconditionally. This value may be used for interference management.

In various embodiments, among availability attributes and/or values, IA1 may be called unconditionally available, IA2 may be called conditionally available, INA1 may be called conditionally unavailable, and INA2 may be called unconditionally unavailable. The four abbreviations are used herein for convenience, but these four values may be used by other terms. In certain embodiments, a difference between available or unavailable, or between conditional and unconditional, may be specified by a combination of availability values, behavior rules, and so forth.

In some embodiments, a behavior associated with values IA2 and INA1 have similarities—in both cases, a TCI state may be used by the IAB-DU if the use of the TCI state does not change an IAB-MT operation. However, two distinct values may be used as the IAB-DU's default behavior and may be different for a TCI state that is indicated IA2 versus indicated INA1. For example, if a TCI state is indicated INA1, the IAB-DU may use the TCI state for a downlink transmission only if no other IAB-MT operation is scheduled until the time of transmissions. However, if a TCI state is indicated IA2, the IAB-DU may use the TCI state for a downlink transmission if an IAB-MT operation is not scheduled earlier than a time threshold based on the IAB-DU transmission and a decoding delay capability by the IAB node. Furthermore, a value of INA1 may be taken as a default, for the time-domain, if no availability indication is received for a TCI state.

In various embodiments, since there are four values (and associated behaviors) for determining availability of a TCI state, a modification may be needed with respect to the H/S/NA signaling and behavior as specified for a time domain.

In certain embodiments, instead of one bit for an AI index, two bits may be used for an AI index, hence allowing to indicate any of the 4 values described herein.

In some embodiments, two AI index values may be received by N. A first AI value may select among two of the four values, such as the values IA1 or INA1, which may indicate a similar behavior as AI in the time domain. However, a second AI value may then determine an IA2 or INA2. In some implementations, the second AI value may or may not be received by N.

In various embodiments, AI values may be indicated for different types of TCI states. For example, IA1 or INA1 may be indicated for a soft TCI state, while IA2 or INA2 may be indicated for a hard TCI state.

In certain embodiments, if more than one AI index value is received for a TCI state, different rules for avoiding conflicts, neglecting a later AI index value, or overriding an earlier AI index value may be applied. Each of the rules may be determined by the standard or by a configuration.

In some embodiments, avoiding conflicts may include: an IAB node may not be expected to receive conflicting AI index values for a TCI state. In various embodiments, neglecting a later value may include: an IAB node may neglect a later AI index value for a TCI state and behave according to an AI index value received earlier. In certain embodiments, overriding an earlier value may include: an IAB node may override an earlier AI index value for a TCI state if it receives a different AI index value for the TCI state later. In some embodiments, priority among values may include: an IAB node may assign higher priority to some values among {IA1, IA2, INA1, INA2} with respect to other values. As an example, IA1 and INA2 indicate an unconditional availability or unavailability, which may take a higher priority compared to the other two values IA2 and INA1. As another example, a priority such as INA2>INA1>IA2>IA1 may determine the IAB node's behavior. For example, if a TCI state is indicated a value of INA1 in one AI message and a value of IA2 in another AI message, the IAB node may assume a value of INA1. Other priority orders are not precluded, which may be determined by a signaling, configuration, or specification.

In various embodiments, there may be a combination of other embodiments: an IAB node may determine an AI value based on a combination of rules described herein. For example, for some pairs of values, a neglecting or overriding rule may apply; while for other pairs of values, a priority rule may apply. The rules and the order of their application may be determined by a signaling, configuration, or specification.

In certain embodiments, if, as an example, we take the realization of four AI index values for a soft TCI state, the following modified rules may be specified for use of TCI states by the IAB-DU: 1) if a TCI state is configured as hard, the TCI state may be used for a downlink transmission; 2) if a TCI state is configured as soft, the TCI state may be used for a downlink transmission only if a) the IAB-MT does not transmit or receive (and the IAB-MT does not detect an availability indication or other control signaling with a field value of INA2 (e.g., unconditionally unavailable) for the TCI state), b) the IAB-MT would transmit or receive, and the transmission or reception is not changed due to a use of the TCI state by the IAB-DU, (and the IAB-MT detects an availability indication or other control signaling with a field value of IA2 or INA1 (e.g., conditionally available or conditionally unavailable) for the TCI state), or c) the IAB-MT detects an availability indication or other control signaling with a field value of IA1 for the TCI state; and 3) if a TCI state is configured as unavailable, the TCI state may not be used for a downlink transmission. It should be noted that in such embodiments, the parent node PN may also need to be informed of the TCI state configurations and their H/S/NA attributes to be able to produce availability indication or other control signaling that indicates availability of TCI states to the IAB node N. It should also be noted that the child node CN may not use information of the H/S/NA attributes. Therefore, the information may not be sent to CN or, otherwise, the information may be neglected by CN.

In a second embodiment, an IAB-CU may configure a plurality of TC states (e.g., TCI-State IEs) for CN-MT. The IAB-CU may also configure a PDSCH (e.g., PDSCH-Config IE) for CN-MT, which includes IDs of a maximum of M of the TCI states. A MAC-CE message (e.g., with LCID=53), may then activate up to 8 of the M TCI states by a bitmap. Finally, 3 bits in DCI 1_1 may indicate a TC state from the activated TCI states. However, in this embodiment, H/S/NA attributes are not configured for the TCI states by referring to their IDs. Instead, a TCI state may be assigned availability attributes indirectly, for example, in association with resources in time and frequency domains. For example, a TCI state may be available or unavailable, conditionally or unconditionally, for a certain period of time and/or on certain frequency resources. The advantage of this embodiment include that the configurations may be produced at a F1AP, for example, rather than the RRC. As a result, H/S/NA attributes for a physical beam may be determined jointly based on F1AP configurations and RRC configurations.

In some embodiments, a configuration such may assign HS/NA attributes as shown in FIG. 17. Specifically, FIG. 17 is a schematic block diagram illustrating one embodiment of resource configuration 1700. According to FIG. 17, the GNB-DU-Cell-Resource-Configuration IE, which may be delivered by the F1 interface, includes an optional field hSNASpatialConfigList, which is essentially a list of HSNASpatialConfigItem IEs, each one including resources in time and/or frequency domains, indicated by the field timeFreqResource, and an H/S/NA attribute associated with the resources, indicated by the field hsna.

In various embodiments, a field type TimeFrequencyResource may indicate: 1) a time-domain resource such as one or multiple symbols, one or multiple slots, a duration in milliseconds, or the like; 2) a frequency-domain resource such as one or multiple physical resource blocks ("PRBs"), one or multiple resource block groups ("RBGs"), a partition of a bandwidth part ("BWP"), component carrier ("CC"), or so forth including one or multiple PRBs or RBGs, or the like; 3) or a combination thereof.

In certain embodiments, if an IAB node receives a configuration as found herein, it may determine that a TCI state indicating a QCL relationship with a reference signal on the resources indicated by the field timeFreqResource is assigned an attribute indicated by the field hsna.

FIG. 18 is a schematic block diagram illustrating one embodiment of a TCI state configuration 1800. According to FIG. 18, an IAB node may determine that the TCI state is H, S, or NA as indicated by hsna if the reference signal indicated by NZP-CSI-RS-ResourceId or SSB-Index uses a resource in the resources indicated by timeFreqResource.

In some embodiments, an IAB node may determine that the TCI state is H, S, or NA as indicated by hsna if the reference signal indicated by NZP-CSI-RS-ResourceId or SSB-Index uses a resource in the resources indicated by timeFreqResource and if the associated qcl-Type is a spatial QCL such as typeD. For example, suppose an IAB node receives a hSNASpatialConfigList IE that assigns the value hard to slot #1 and the value soft to slot #2. Then, the IAB node may determine that a first TCI state comprising a QCL indication (or Type D QCL indication) to a reference signal in slot #1 is hard, while a second TCI state comprising a QCL indication (or Type D QCL indication) to a reference signal in slot #2 is soft and, hence, subject to availability indication by a parent node.

In various embodiments, the fields timeFreqResource and hsna are optional. If any of the fields are missing, a default value may be assumed based on a configuration or a specification. For example, if an IAB node receives a configuration including only a field hsna with value soft, it may determine that all TCI states are soft and, hence, may be subject to availability indication by a parent node.

In another embodiment, an IAB node may receive a configuration, such as the example in FIG. 19. FIG. 19 is a schematic block diagram illustrating one embodiment of an IAB node configuration 1900. The IE definition is similar to that of other embodiments, but the interpretation by the IAB node is different. In this embodiment, the IAB node may determine that if a channel such as a PDSCH is to be scheduled on resources indicated by the field timeFreqResource, the TCI state indicated for the channel is assigned the attribute indicate by the field hsna.

In various embodiments, an IAB node may determine that if a channel, such as a PDSCH or a PDCCH, is to be scheduled on resources indicated by the field timeFreqResource, the TCI state indicated for the channel is assigned the attribute indicated by the field hsna if the TCI state includes a spatial QCL indication such as a Type D QCL indication. For example, suppose an IAB node receives a hSNASpatialConfigList2 IE that assigns the value hard to slot #1 and the value soft to slot #2. Then, the IAB node may determine that a first TCI state for a PDSCH in slot #1 is hard, while a second TCI state for a PDSCH in slot #2 is soft and, hence, subject to availability indication by a parent node. This embodiment may be useful for CLI management. For example, consider the scenarios in FIG. 20.

FIG. 20 is a schematic block diagram illustrating one embodiment of a system 2000 with interface scenarios for simultaneous IAB-DU and IAB-MT operations. The interface scenarios include a Case A 2002 (e.g., for N), a Case B 2004 (e.g., for N), a Case C 2006 (e.g., for N), and a Case D 2008 (e.g., for N).

In Case A 2002 multiplexing, if a TX beam of N-DU (e.g., associated with a TCI state of N-DU) causes an excessive interference on PN, then PN may schedule a PUSCH on slot whose TCI states for N are soft. Then, PN may indicate to N that the said TCI state is not available to N-DU on the said slot, hence avoiding an excessive interference when receiving the PUSCH. An availability indication in a spatial domain may include similar signaling to other embodiments. An availability indication in the spatial domain may be helpful for CLI management. This is in addition to panel and/or beam management for enhanced duplexing in IAB systems.

In certain embodiments, configuration information may be sent to an IAB node (N) and its parent node (PN) such that PN may inform N which beams are available or unavailable to N at a given time (or generally, on a set of time and frequency resources) based on the configuration information. The configuration may be provided by a higher layer or by multiple layers. In some embodiments, if CLI management is intended, it is possible to reduce complexity.

In a third embodiment, an IAB node (N) is configured with one or multiple reference signals for IAB-DU operation via a higher layer by an IAB-CU. Each of the reference signals may be a CSI-RS, an SS/PBCH block ("SSB"), or another reference signal that may be used for interference measurement. Furthermore, information of the reference signal configurations is sent to a parent node (PN) of the IAB node. In this embodiment, PN does not necessarily receive information of TCI state configurations. Instead, PN receives information of resources that N may use to transmit a reference signal. Next, N may transmit a reference signal on the resources while applying a beam on an antenna panel of N. PN may perform measurements on the resources. Then, based on the measurement, PN may determine, based on the measurements, whether a signal sent through the beam and antenna panel by N may cause an excessive interference on PN. Then, PN may indicate to N whether the beam and antenna panel is available or unavailable to N for a signal transmission at a given time (or generally, on a set of time and frequency resources). This embodiment may allow a less complex approach as the configuration information shared among nodes is reduced to reference signal configurations including resources used for the reference signals rather than additional information such as TCI configurations.

In some embodiments, availability indication signaling may be a layer 1 ("L1") and/or ("L2") control signaling such as a DCI message or a MAC message. The availability indication message may include any or all the following fields: a node identifier ("ID"), an indication of a reference signal, time and/or frequency resources, and/or availability indication.

In various embodiments: first, if the control message is a group-common DCI, as was the case of time-domain availability in IAB, one node may need to be specified among a group of nodes; second, PN may indicate to N which reference signal is or is not available—in one realization, PN may indicate the reference signal to N by an ID or index to the reference signal such as an NZP-CSI-RS-ResourceId or an SSB-Index—in another realization, PN may indicate the reference signal to N by indicating a reference signal resource such as a symbol number and/or a slot number; third, PN may indicate to N that a beam associated with the reference signal is or is not available for which resources in time and/or frequency domains—resources may be indicated explicitly in symbols or slots or milliseconds in the time domain and/or in PRBs in the frequency domain (Alt-1)—alternatively, resources may be indicated implicitly in association with a signal or channel (Alt-2)—for example, in the aforementioned Case A 2002 CLI example, PN may schedule a PUSCH for an IAB-MT of N and indicate to N that a beam is or is not available for IAB-DU transmission on resources that overlap with resources of the PUSCH in time and/or frequency domains; fourth, PN may indicate whether the beam is available or unavailable. Details of availability indication and IAB node behavior may be similar to the availability indication method proposed for other embodiments.

In certain embodiments, there may be non-periodic reference signals.

In some embodiments, a reference signal may not be periodic. Instead, the reference signal may be semi-persistent or aperiodic to be activated and/or triggered by the IAB node N. If information of activation or triggering a reference signal is not conveyed to the parent node, the parent node may perform a measurement on a resource while assuming the reference signal was transmitted. In these embodiments, if an IAB node receives an availability indication with reference to a reference signal that it has not transmitted, it may behave differently. For example, in one realization, the IAB node may neglect an availability indication of a beam associated with a semi-persistent reference signal that is deactivated or an aperiodic reference signal that is not recently transmitted. In another example, the IAB node may assume the beam associated is unavailable for IAB-DU transmission.

In various embodiments, interference and/or CLI measurements may be constrained to periodic reference signals.

In certain embodiments, there may be a received signal strength indicator ("RSSI") instead of reference signal received power ("RSRP"). To simplify things, a parent node PN may perform measurements on signals received from N and calculate a signal strength such as an RSSI. Then, instead of an indication of a reference signal in the control message, PN may indicate a resource in time and/or frequency domains (e.g., similar to Alt-2). Then, the IAB node may determine a spatial filter (e.g., beam) that it applied for transmitting a signal on the indicated resource and determine, based on availability indication field in the control message, whether the beam is available for communication on another resource.

In a fourth embodiment, availability of a beam may not be indicated by a parent node in reference to a plurality of time-frequency resources. Instead, the parent node may indicate a beam available or unavailable, for example, on a semi-persistent basis; i.e., a beam that is indicated available or unavailable will remain, respectively, available or unavailable until another signalling or rule changes its availability status.

In one realization of the fourth embodiment, an IAB node (N) may be configured with a reference signal on soft resources such as a soft symbol. Information of the reference signal configuration is additionally sent to a parent node (PN). Then, if PN indicates to N that the said soft resources are available, N may infer that a beam associated with the resources is also available. Conversely, if PN indicates to N that the said soft resources are unavailable, N may infer that a beam associated with the resources is also unavailable.

In certain embodiments, resources on which a periodic reference signal is configured are automatically considered hard resources, and may best be implemented by a semi-persistent or aperiodic reference signal, such as a semi-persistent CSI-RS or an aperiodic CSI-RS. In various embodiments, a periodic reference signal may be allowed to be "muted" by indicating a resource of the reference signal unavailable.

FIGS. 21 through 25 illustrate different embodiments. Several details and common steps in such methods may be omitted in these Figures for the sake of brevity.

Figure 21:
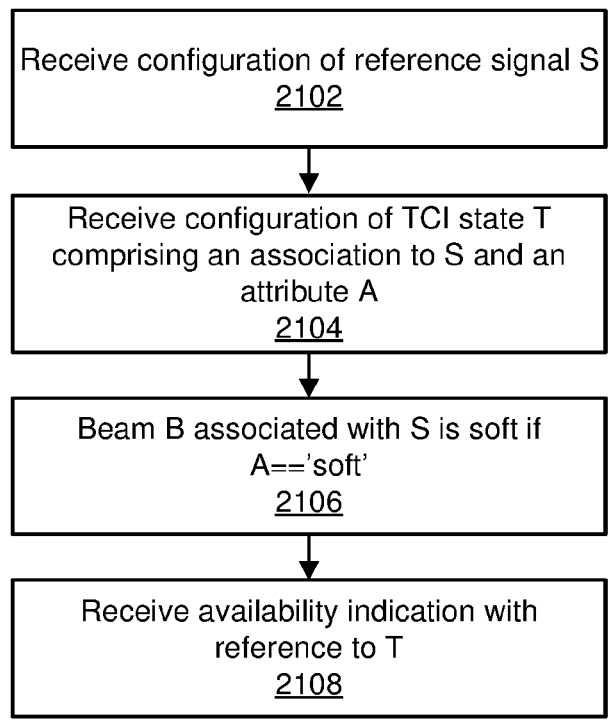
FIG. 21 is a flow block diagram illustrating one embodiment of a method of a first configuration embodiment.

FIG. 21 is a flow block diagram illustrating one embodiment of a method 2100 of a first configuration embodiment. The method 2100 includes receiving 2102 configuration of reference signal S, receiving 2104 configuration of TCI state T comprising an association to S and an attribute A, beam B being 2106 associated with S is soft if A=='soft', and receiving 2108 an availability indication with reference to T.

Figure 22:
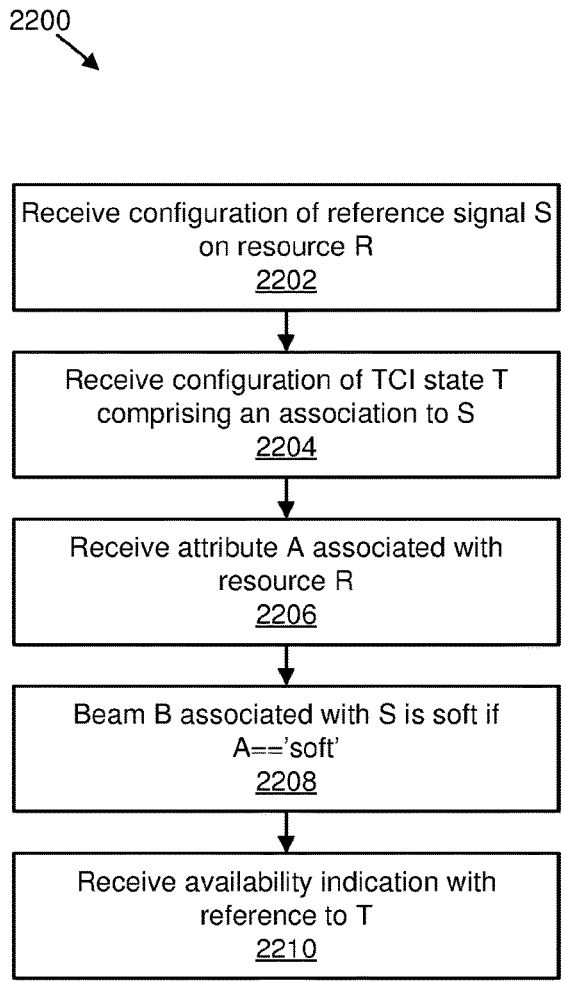
FIG. 22 is a flow block diagram illustrating one embodiment of a method of a first configuration embodiment.

FIG. 22 is a flow block diagram illustrating one embodiment of a method 2200 of a first configuration embodiment. The method 2200 includes receiving 2202 configuration of reference signal S on resource R, receiving 2204 configuration of TCI state T comprising an association to S, receiving 2206 attribute A associated with resource R, beam B being 2208 associated with S is soft if A=='soft', and receiving 2210 availability indication with reference to T.

Figure 23:
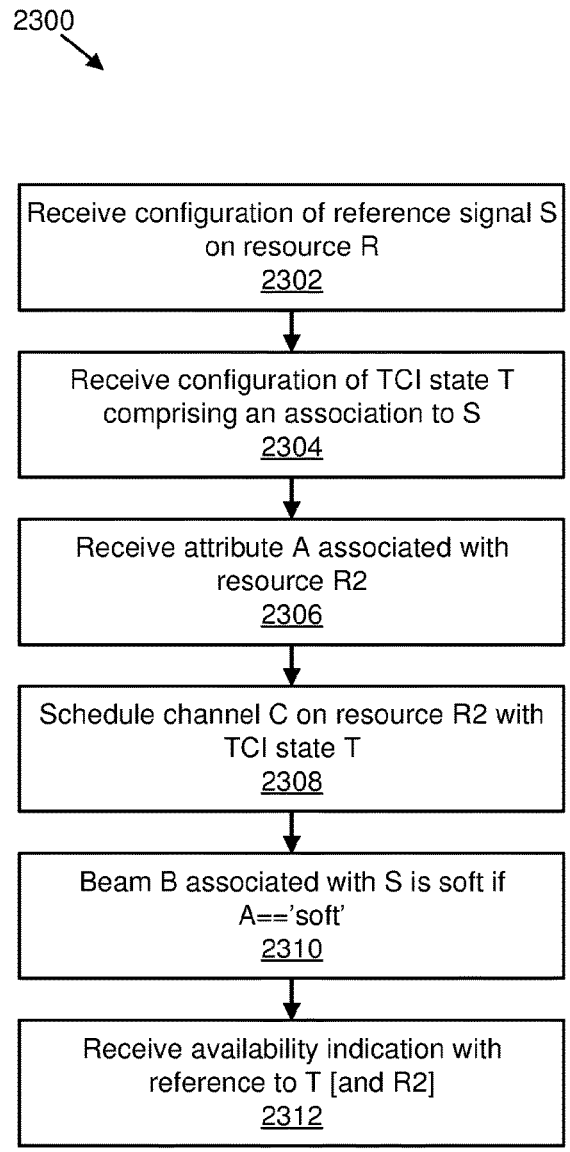
FIG. 23 is a flow block diagram illustrating one embodiment of a method of a first configuration embodiment.

FIG. 23 is a flow block diagram illustrating one embodiment of a method 2300 of a first configuration embodiment. The method 2300 includes receiving 2302 configuration of reference signal S on resource R, receiving 2304 configuration of TCI state T comprising an association to S, receiving 2306 attribute A associated with resource R2, scheduling 2308 channel C on resource R2 with TCI state T, beam B being 2310 associated with S is soft if A=='soft', and receiving 2312 availability indication with reference to T [and R2].

FIG. 24 is a flow block diagram illustrating one embodiment of a method 2400 of a first configuration embodiment. The method 2400 includes receiving 2402 configuration of reference signal S on resource R, receiving 2404 configuration of TCI state T comprising an association to S, receiving 2406 attribute A associated with TCI state T [or resource R], beam B being 2408 associated with S is soft if A=='soft', and receiving 2410 an availability indication with reference to S [or R].

FIG. 25 is a flow block diagram illustrating one embodiment of a method 2500 of a first configuration embodiment. The method 2500 includes receiving 2502 configuration of reference signal S on resource R, receiving 2504 configuration of TCI state T comprising an association to S, receiving 2506 attribute A associated with resource R, beam B being 2508 associated with S is soft if A=='soft', and receiving 2510 an availability indication with reference to R.

In certain embodiments, there may be a beam indication in NR for a PDSCH reception by a UE or an IAB-MT is performed through using TCI states. A TCI state may include up to two QCL-Info IEs, which in turn may include a spatial QCL (e.g., Type D) indication to a reference signal ID or index. Therefore, indication of a reference signal index, which is supposedly beamformed, is the essence of beam indication for a PDSCH reception.

In some embodiments, for an uplink transmission by a UE or an IAB-MT, beam indication in the opposite direction is performed through indicating a reference signal index. Beam indication for uplink does not use TCI states. Instead, beam indication for PUSCH, physical uplink control channel ("PUCCH"), and SRS is signaled through fields that are named Spatial Relation Info, sounding reference signal ("SRS") resource indicator ("SRI"), and so forth. Nevertheless, beam indication is similar in essence. As a result, methods may be used for downlink transmission to a UE or a child node IAB-MT may be applied to uplink reception from a UE or a child node IAB-MT. TCI states may be used for UL beam indication (e.g., beam indication for PUSCH and PUCCH).

In various embodiments, an IAB-CU may configure a plurality of SRSs (SRS-Config IEs) for CN-MT. Each of the SRSs may be assigned a hard (H), soft (S), or unavailable (not-available or NA) attribute by the IAB-CU. A hard/soft/NA attribute may be assigned to an SRS configuration directly, for example by including an optional HSNA field in an SRS-Config IE. Alternatively, a hard/soft/NA attribute may be assigned to an SRS indirectly, for example by including an optional HSNA field in attribute may be assigned indirectly, for example by including an optional HSNA field in an SRS-ResourceSet IE, an SRS-Resource IE, or a like. In the latter case, if an SRS resource set or an SRS resource is used in SRS configuration directly or indirectly, for example by including an SRS resource set ID or an SRS resource ID in the SRS configuration IE, then the attribute may be indirectly assigned to the SRS. In any case, an HSNA field may take a value of 'hard', 'soft', or 'unavailable'.

In certain embodiments, a default value for an HSNA attribute may be determined implicitly, for example, based on another field in the SRS configuration. As an example, if an SRS resource set has its 'usage' field set to the value 'beamManagement', an SRS configuration comprising an ID of the SRS resource set may be assigned a 'soft' attribute by default. As another example, if a SpatialRelationInfo field in an SRS resource configuration includes a reference to an CSI-RS resource that is assigned a 'soft' attribute, an SRS using the SRS resource may be implicitly assigned a 'soft' attribute by default.

In some embodiments, information of an attribute may be sent to the IAB node N, the parent node (PN), and/or the child node (CN). This may be reflected as an IAB node that may be informed of SRS configurations and H/S/NA attributes configured for a child node.

In various embodiments, H/S/NA attribute information may only be sent to the parent node (N in this example), not the IAB node (CN in this example).

In certain embodiments, an SRS that has not been configured with an H/S/NA attribute may be assumed to have a default attribute such as H, S, or NA, which may be determined by a standard or by a configuration. In some realizations, a default attribute for an SRS may be H. Alternatively, in some realizations, a default attribute for an SRS may be S, i.e., any SRS configuration may be followed by availability indication signaling from a parent node.

In some embodiments, similar to the case of DL TX, due to intrinsic differences between resources in the time-frequency domain and the spatial domain, the attribute NA may be redundant. For example, an SRS with an NA attribute may simply not be configured by the IAB-CU or deactivated by a parent node. Therefore, in an alternative realization, only H and S attributes may be configured for an SRS.

In various embodiments, once configurations are sent to N and/or CN, an IAB node N may indicate an SRS resource indicator ("SRI") for scheduling an uplink channel such as a PUSCH as follows. Here, the IAB-DU and the IAB-MT are part of a IAB node N: 1) if an SRS is configured as hard, the associated SRI may be used for an uplink reception; 2) if an SRS is configured as soft, the associated SRI may be used for an uplink reception only when a) the IAB-MT does not transmit or receive, b) the IAB-MT would transmit or receive, and the transmission or reception is not changed due to an indication of the SRI by the IAB-DU, or c) the IAB-MT detects an availability indication or other control signaling with a field value indicating the SRI associated with the soft SRS as available; and/or 3) if an SRS is configured as unavailable, the associated SRI may not be used for an uplink reception. These rules are for use of H, S, or NA resources in the time domain (e.g., for symbols in a slot).

In certain embodiments, similar to the case of DL TX, the rules do not allow a parent node PN to indicate to the IAB node N that an SRI is strictly unavailable. Instead, they only allow PN to warn N that there may be communications by the IAB-MT conflicting with an indication of an SRI by the IAB-DU, but a beam paired with the beam associated with the SRI may still be used if an implementation of N allows a simultaneous communication between the IAB-MT and the IAB-DU.

However, in some embodiments, such as interference management scenarios, PN may need to indicate to N that an SRI "shall" not be used. For example, consider Case C multiplexing where CN transmits to N and N simultaneously transmits to PN. If PN performs an RX beamforming towards an IAB-MT antenna of N to receive an uplink signal, an uplink signal from an IAB-MT antenna of CN to N on a certain TX beam may cause an excessive interference on PN. Therefore, having performed interference measurements, PN may need to indicate to N that the TX beam (i.e., SRI) is not available to CN, and that is even if an implementation of N may allow it to use an N RX beam paired with the CN TX beam without changing an IAB-MT behavior for N.

In various embodiments, rules may be added for using beams. In some realizations, additional values may be indicated for determining availability of a soft resource. Similar to the case of DL TX, the abbreviations IA (is available) and INA (is not available) are used for availability of an SRI associated with a soft SRS.

For IA1: if this value is indicated for a soft SRS, the associated SRI is available to a child node of N unconditionally. This is similar to a value of '1' in an AI of a soft symbol in the time domain. For IA2: if this value is indicated for a soft SRS, the associated SRI is available to a child node of N only if it does not change an IAB-MT operation. This is similar to a CAI for the frequency domain.

For INA1: if this value is indicated for a soft SRS, the associated SRI is unavailable to [a child node of] N unless an implementation of N allows N to use the SRI simultaneously with another operation, for example, an IAB-MT operation. This is similar to a value of '0' in an AI of a soft symbol in the time domain. For INA2: if this value is indicated for a soft SRS, the associated SRI is unavailable to a child node of N unconditionally. This value may be used for interference management.

In some embodiments, among availability attributes and/ or values, IA1 may be called unconditionally available, IA2 may be called conditionally available, INA1 may be called conditionally unavailable, and INA2 may be called unconditionally unavailable. The four abbreviations are used for convenience, but a specification in a standard may not explicitly define four values. Instead, the difference between available or unavailable, or between conditional and unconditional, may be specified by a combination of availability values, behavior rules, and so forth.

In various embodiments, behaviors associated with the values IA2 and INA1 have similarities. In both cases, a beam may be used by the IAB-DU if the use of the beam does not change an IAB-MT operation. However, two distinct values may be used as the IAB-DU's default behavior may be different for a beam that is indicated IA2 versus indicated INA1. For example, if a beam is indicated INA1, the IAB-DU may use the beam for an uplink reception only if no other IAB-MT operation is scheduled until the time of transmissions. However, if a beam is indicated IA2, the IAB-DU may use the beam for an uplink reception if an IAB-MT operation is not scheduled earlier than a time threshold based on the IAB-DU transmission and a decoding delay capability by the IAB node. Furthermore, a value of INA1 may be taken as a default if no availability indication is received for a beam. Since there are four values (and associated behaviors) for determining availability of an SRI, a modification may be needed with respect to the H/S/NA signaling and behavior as specified for the time domain.

In one realization, instead of one bit for an AI index, two bits may be used for an AI index, hence allowing to indicate any of the above 4 values. In another realization, two AI index values may be received by N. A first AI value may select among two of the values, such as the values IA1 or INA1 above, which may indicate a similar behavior as AI in the time domain as specified in IAB Rel-16. However, a second AI value may then determine an IA2 or INA2 as defined above. In some implementations, the second AI value may or may not be received by N. In yet another realization, the AI values above may be indicated for different types of SRSs. For example, IA1 or INA1 may be indicated for a soft SRS, while IA2 or INA2 may be indicated for a hard SRS. Furthermore, if more than one AI index value is received for an SRS, different rules for avoiding conflicts, neglecting a later AI index value, or overriding an earlier AI index value may be applied. Each of the rules may be determined by the standard or by a configuration.

In certain embodiments, there may be avoiding conflicts: an IAB node may not be expected to receive conflicting AI index values for an SRI. In some embodiments, there may be neglecting of a later value: an IAB node may neglect a later AI index value for an SRI and behave according to an AI index value received earlier. In various embodiments, there may be overriding an earlier value: an IAB node may override an earlier AI index value for an SRI if it receives a different AI index value for the SRI later. In certain embodiments, there may be a priority among values: an IAB node may assign higher priority to some values among {IA1, IA2, INA1, INA2} with respect to other values. As an example, IA1 and INA2 indicate an unconditional availability or unavailability, which may take a higher priority compared to the other two values IA2 and INA1. As another example, a priority such as INA2>INA1>IA2>IA1 may determine the IAB node's behavior. For example, if an SRI is indicated a value of INA1 in one AI message and a value of IA2 in another AI message, the IAB node may assume a value of INA1. Other priority orders are not precluded, which may be determined by a signaling, configuration, or specification.

In some embodiments, an IAB node may determine an AI value based on a combination of any rules. For example, for some pairs of values, a neglecting or overriding rule may apply; while for other pairs of values, a priority rule may apply. The rules and the order of their application may be determined by a signaling, configuration, or specification.

If, as an example, there are four AI index values for a soft SRS, the following modified rules may be used for indication of SRIs: 1) if an SRS is configured as hard, the associated SRI may be used for an uplink reception; 2) if an SRS is configured as soft, the associated SRI may be used for an uplink reception only if a) the IAB-MT does not transmit or receive, (and the IAB-MT does not detect an availability indication or other control signaling with a field value of INA2 (e.g., unconditionally unavailable) for the SRI), b) the IAB-MT would transmit or receive, and the transmission or reception is not changed due to a use of the SRI by the IAB-DU, (and the IAB-MT detects an availability indication or other control signaling with a field value of IA2 or INA1 (e.g., conditionally available or conditionally unavailable) for the SRI, or c) the IAB-MT detects an availability indication or other control signaling with a field value of IA1 for the SRI; and/or 3) if an SRS is configured as unavailable, the associated SRI may not be used for a uplink reception. It should be noted that the child node CN may not use information of the H/S/NA attributes. Therefore, the information may not be sent to CN or, otherwise, the information may be neglected by CN.

In various embodiments, an IAB-CU may configure a plurality of SRSs (SRS-Config IEs) for CN-MT. Each of the SRSs may be assigned a hard (H), soft (S), or unavailable (not-available or NA) attribute by the IAB-CU. A hard/soft/NA attribute may be assigned to an SRS configuration directly, for example, by including an optional HSNA field in an SRS-Config IE. Alternatively, a hard/soft/NA attribute may be assigned to an SRS indirectly, for example, by including an optional HSNA field in attribute may be assigned indirectly, for example by including an optional HSNA field in an SRS-ResourceSet IE, an SRS-Resource IE, or the like. In the latter case, if an SRS resource set or an SRS resource is used in SRS configuration directly or indirectly, for example, by including an SRS resource set ID or an SRS resource ID in the SRS configuration IE, then the attribute may be indirectly assigned to the SRS. In any case, an HSNA field may take a value of 'hard', 'soft', or 'unavailable'. In some realizations, a default value for an HSNA attribute may be determined implicitly, for example, based on another field in the SRS configuration. As an example, if an SRS resource set has its 'usage' field set to the value 'beamManagement', an SRS configuration comprising an ID of the SRS resource set may be assigned a 'soft' attribute by default. As another example, if a SpatialRelationInfo field in an SRS resource configuration comprises a reference to an CSI-RS resource that is assigned a 'soft' attribute, an SRS using the SRS resource may be implicitly assigned a 'soft' attribute by default.

In certain embodiments, information of the attribute may be sent to the IAB node N, the parent node (PN), and/or the child node (CN). However, in some embodiments, H/S/NA attributes are not configured for the SRSs directly. Instead, an SRS may be assigned availability attributes indirectly, for example, in association with resources in time and frequency domains. For example, an SRS may be available or unavailable, conditionally or unconditionally, for a certain period of time and/or on certain frequency resources. The advantage of some embodiments is that the configurations may be produced at the F1AP, for example, rather than the RRC. As a result, H/S/NA attributes for a physical beam may be determined jointly based on F1AP configurations and RRC configurations.

In some embodiments, a configuration may assign H/S/NA attributes as found herein. The GNB-DU-Cell-Resource-Configuration IE, which may be delivered by the F1 interface, includes an optional field hSNASpatialConfigList, which is essentially a list of HSNASpatialConfigItem IEs, each one including resources in time and/or frequency domains, indicated by the field timeFreqResource, and an H/S/NA attribute associated with the resources, indicated by the field hsna.

In various embodiments, the field type TimeFrequencyResource may indicate: 1) a time-domain resource such as one or multiple symbols, one or multiple slots, a duration in milliseconds, or the like; 2) a frequency-domain resource such as one or multiple PRBs, one or multiple RBGs, a partition of a BWP, CC, and so forth including one or multiple PRBs or RBGs, or the like; and/or 3) a combination thereof.

In certain embodiments, if an IAB node receives a configuration as defined herein, it may determine that an SRI associated with an SRS on the resources indicated by the field timeFreqResource is assigned the attribute indicated by the field hsna. Then, according to this realization, the IAB node may determine that the SRS or an associated SRI is H, S, or NA as indicated by hsna if the reference signal indicated by the SRI uses a resource in the resources indicated by timeFreqResource. For example, suppose an IAB node receives a hSNASpatialConfigList IE that assigns the value hard to slot #1 and the value soft to slot #2. Then, the IAB node may determine that a first SRS in slot #1 is hard, while a second SRS in slot #2 is soft and, hence, subject to availability indication by a parent node. The fields timeFreqResource and hsna may be optional. Then, if any of the fields is missing, a default value may be assumed based on a configuration or specification. For example, if the IAB node receives a configuration comprising only a field hsna with value soft, it may determine that all SRSs are soft and, hence, associated SRIs may be subject to availability indication by a parent node.

In some embodiments, an IAB node may receive a configuration, but the interpretation by the IAB node may be different. In such embodiments, the IAB node may determine that if a channel such as a PUSCH is to be scheduled on resources indicated by the field timeFreqResource, the SRI indicated for the channel is assigned the attribute indicated by the field hsna. For example, suppose an IAB node receives a hSNASpatialConfigList IE that assigns the value hard to slot #1 and the value soft to slot #2. Then, the IAB node may determine that a first SRS for a PUSCH in slot #1 is hard, while a second SRS for a PUSCH in slot #2 is soft and, hence, subject to availability indication by a parent node. These embodiments may be useful for CLI management. In Case C multiplexing, if a TX beam of CN-MT (e.g., associated with an SRI indicated for the CN-MT) causes an excessive interference on PN, then PN may schedule a PUSCH on slot whose SRSs for N are soft. Then, PN may indicate to N that an SRI associated the said SRSs is not available to uplink scheduling by N-DU on the said slot, hence, avoiding an excessive interference when receiving the PUSCH.

In various embodiments, an availability indication in the spatial domain may be helpful for CLI management. This is in addition to panel and/or beam management for enhanced duplexing in IAB systems.

In certain embodiments, configuration information may be sent to an IAB node (N) and its parent node (PN) such that PN may inform N which beams are available or unavailable to N at a given time (or generally, on a set of time and frequency resources) based on the configuration information. The configuration may be provided by a higher layer or by multiple layers. However, if CLI management is intended, it is possible to reduce complexity.

In some embodiments, a CN is configured with one or multiple SRSs by a higher layer. Furthermore, information of the SRSs is sent to N and PN. In these embodiments, N and PN receive information of resources that CN may use to transmit an SRS. Next, CN may transmit an SRS on the said resources while applying a beam on an antenna panel of CN. PN may perform measurements on the said resources. Then, based on the measurement, PN may determine, based on the measurements, whether a signal sent through the beam and antenna panel by CN may cause an excessive interference on PN. Then, PN may indicate to N whether the beam and antenna panel is available or unavailable for an uplink transmission from CN to N at a given time (or generally, on a set of time and frequency resources). Such embodiments may allow a less complex approach as the configuration information shared among nodes is reduced to SRS configurations comprising resources used for the SRSs.

In various embodiments, availability indication signaling may be L1 and/or L2 control signaling such as a DCI message or a MAC message. The availability indication message may include any or all the following fields: a node identifier, an indication of an SRS, time and/or frequency resources, and/or an availability indication.

In certain embodiments: first, if the control message is a group-common DCI, one node may need to be specified among a group of nodes; second, PN may indicate to N which SRS is or is not available—in one realization, PN may indicate the SRS to N by an ID or index to the reference signal such as an SRS-ResourceId—in another realization, PN may indicate the reference signal to N by indicating a resource such as a symbol number and/or a slot number; third, PN may indicate to N that a beam associated with the SRS is or is not available for which resources in time and/or frequency domains—resources may be indicated explicitly in symbols or slots or milliseconds in the time domain and/or in PRBs in the frequency domain (Alt-1)—alternatively, resources may be indicated implicitly in association with a signal or channel (Alt-2)—for example, in the aforementioned Case C CLI example, PN may schedule a PUSCH for an IAB-MT of N and indicate to N that a beam is or is not available for transmission on resources that overlap with resources of the PUSCH in time and/or frequency domains; and fourth, PN may indicate whether the beam is available or unavailable.

In some embodiments, for non-periodic reference signals: a reference signal may not be periodic. Instead, the reference signal may be semi-persistent or aperiodic to be activated and/or triggered by the IAB node N. If information of activation or triggering a reference signal is not conveyed to the parent node PN, the parent node may perform a measurement on a resource while assuming the reference signal was transmitted. In this case, if an IAB node receives an availability indication with reference to a reference signal that it has not transmitted, it may behave differently. For example, in one realization, the IAB node may neglect an availability indication of a beam associated with a semi-persistent reference signal that is deactivated or an aperiodic reference signal that is not recently transmitted. In another example, the IAB node may assume the beam associated is unavailable for IAB-DU reception.

In various embodiments, interference and/or CLI measurements may be constrained to periodic reference signals.

In certain embodiments, RSSI may be used instead of RSRP: to simplify a method further, a parent node PN may perform measurements on signals received from CN and calculate a signal strength such as an RSSI. Then, instead of an indication of a reference signal in the control message, PN may indicate a resource in time and/or frequency domains (e.g., similar to Alt-2). Then, the IAB node may determine a spatial filter (e.g., beam) that CN may have applied for transmitting a signal on the indicated resource and determine, based on availability indication field in the control message, whether the said beam is available for communication on another resource.

In some embodiments, availability of a beam may not be indicated by a parent node in reference to a plurality of time-frequency resources. Instead, the parent node may indicate a beam available or unavailable, for example, on a semi-persistent basis; i.e., a beam that is indicated available or unavailable will remain, respectively, available or unavailable until another signaling or rule changes its availability status. In one realization, a CN may be configured with an SRS on soft resources such as a soft symbol. Information of the SRS configuration is additionally sent to N and PN. Then, if PN indicates to N that the said soft resources are available, N may infer that a beam associated with the resources is also available. Conversely, if PN indicates to N that the said soft resources are unavailable, N may infer that a beam associated with the resources is also unavailable. Since there may be a rule that resources on which a periodic reference signal is configured are automatically considered hard resources, the above realization may best be implemented by a semi-persistent or aperiodic reference signal. Otherwise, a specification may be modified allowing a periodic reference signal to be "muted" by indicating a resource of the reference signal unavailable.

In various embodiments, there may be an extension of four-value availability indication to time and frequency domains.

In certain embodiments, IAB node behavior with respect to transmitting or receiving a signal in a hard, soft, or unavailable symbol (e.g., in the time domain): 1) with reference to slots of an IAB-DU serving cell, a symbol in a slot of an IAB-DU serving cell can be configured to be of hard, soft, or unavailable type—if a downlink, uplink, or flexible symbol is configured as hard, the IAB-DU serving cell can respectively transmit, receive, or either transmit or receive in the symbol; 2) if a downlink, uplink, or flexible symbol is configured as soft, the IAB-DU can respectively transmit, receive or either transmit or receive in the symbol only if a) the IAB-MT does not transmit or receive in the symbol, b) the IAB-MT would transmit or receive in the symbol, and the transmission or reception in the symbol is not changed due to a use of the symbol by the IAB-DU, or c) the IAB-MT detects a DCI format 2_5 with an AI index field value indicating the soft symbol as available; and/or 3) if a symbol is configured as unavailable, the IAB-DU neither transmits nor receives in the symbol. In essence, a hard symbol is always available to the IAB-DU, an unavailable/NA symbol is always unavailable, and a soft symbol's availability depends, in part, on an AI signaling from a parent node.

In some embodiments, a parent node for control availability of an IAB node may be available only for the purpose of reserving resources for its communication with the IAB-MT (e.g., upstream communication of the IAB node). It means that if an IAB node possesses the capability of performing simultaneous operations in upstream and downstream, it may still use a resource that is not indicated available by a parent node.

In various embodiments, such as interference management scenarios, a parent node (PN) may need to indicate to an IAB node (N) that a resource "shall" not be used. For example, consider Case A multiplexing where N transmits to PN and a child node (CN) simultaneously. A downlink signal from an IAB-DU antenna of N to CN may cause an excessive interference on PN. Therefore, having performed interference measurements, PN may need to indicate to N that a resource is not available to N, and that is even if an implementation of N may allow it to use the resource without changing an IAB-MT behavior.

In certain embodiments, we propose to other rules for availability indication in time and frequency domains may be added. In some realizations, additional values may be indicated for determining availability of a soft resource. The abbreviations IA (is available) and INA (is not available) are used herein for availability of a soft resource in time and frequency domains.

For IA1: if this value is indicated for a soft resource, the resource is available to N unconditionally. This is similar to a value of '1' in an AI of a soft symbol in the time domain. For IA2: if this value is indicated for a soft resource, the resource is available to N only if it does not change an IAB-MT operation. This is similar to CAI for the frequency domain. Moreover, for INA1: if this value is indicated for a soft resource, the resource is unavailable to N unless an implementation of N allows N to use the resource simultaneously with another operation, for example an IAB-MT operation. This is similar to a value of '0' in an AI of a soft symbol in the time domain. Further, for INA2: if this value is indicated for a soft resource, the resource is unavailable to N unconditionally. This value may be used for interference management as explained earlier. Among the above availability attributes and/or values, IA1 may be called unconditionally available, IA2 may be called conditionally available, INA1 may be called conditionally unavailable, and INA2 may be called unconditionally unavailable. The four abbreviations are used in the present disclosure for convenience, but a specification in the standard may not explicitly define four values. Instead, the difference between available or unavailable, or between conditional and unconditional, may be specified by a combination of availability values, behavior rules, and so forth.

In some embodiments, a behavior associated with the values IA2 and INA1 have similarities—in both cases, a resource may be used by the IAB-DU if the use of the resource does not change an IAB-MT operation. However, two distinct values may be used as the IAB-DU's default behavior may be different for a resource that is indicated IA2 versus indicated INA1. For example, if a resource is indicated INA1, the IAB-DU may use the resource for a downlink transmission only if no other IAB-MT operation is scheduled until the time of transmissions. However, if a resource is indicated IA2, the IAB-DU may use the resource for a downlink transmission if an IAB-MT operation is not scheduled earlier than a time threshold based on the IAB-DU transmission and a decoding delay capability by the IAB node. Furthermore, a value of INA1 may be taken as a default, if no availability indication is received for a resource. According to the above, since there are four values (and associated behaviors) for determining availability of a resource in time and/or frequency domains, a modification may be needed with respect to the H/S/NA signaling and behavior as specified for the time domain.

In one realization, instead of one bit for an AI index, two bits may be used for an AI index, hence allowing to indicate any of the above 4 values. In another realization, two AI index values may be received by N. A first AI value may select among two of the values, such as the values IA1 or INA1 above, which may indicate a similar behavior as AI in the time domain. However, a second AI value may then determine an IA2 or INA2 as defined herein. In some implementations, the second AI value may or may not be received by N. In yet another realization, the AI values above may be indicated for different types of resources. For example, IA1 or INA1 may be indicated for a soft resource, while IA2 or INA2 may be indicated for a hard resource. Furthermore, in the case that more than one AI index value is received for a resource, different rules for avoiding conflicts, neglecting a later AI index value, or overriding an earlier AI index value may be applied. Each of the rules may be determined by the standard or by a configuration.

In certain embodiments, there may be avoiding conflicts: an IAB node may not be expected to receive conflicting AI index values for a resource. Further, in some embodiments, there may be neglecting a later value: an IAB node may neglect a later AI index value for a resource and behave according to an AI index value received earlier. Moreover, in various embodiments, there may be overriding an earlier value: An IAB node may override an earlier AI index value for a resource if it receives a different AI index value for the resource later. For priority among values: an IAB node may assign higher priority to some values among {IA1, IA2, INA1, INA2} with respect to other values. As an example, IA1 and INA2 indicate an unconditional availability or unavailability, which may take a higher priority compared to the other two values IA2 and INA1. As another example, a priority such as INA2>INA1>IA2>IA1 may determine the IAB node's behavior. For example, if a resource is indicated a value of INA1 in one AI message and a value of IA2 in another AI message, the IAB node may assume a value of INA1. Other priority orders are not precluded, which may be determined by a signaling, configuration, or specification. There may be a combination thereof: an IAB node may determine an AI value based on a combination of the above rules. For example, for some pairs of values, a neglecting or overriding rule may apply; while for other pairs of values, a priority rule may apply. The rules and the order of their application may be determined by a signaling, configuration, or specification.

If, as an example, the realization of four AI index values is used for a soft resource, the following modified rules may use a resource in time, frequency, spatial, or code domains or a combination thereof. For example: 1) if a resource is configured as hard, the resource may be used for a downlink transmission or uplink reception; 2) if a resource is configured as soft, the resource may be used for a downlink transmission or uplink reception only if a) the IAB-MT does not transmit or receive, (and the IAB-MT does not detect an availability indication or other control signaling with a field value of INA2 (e.g., unconditionally unavailable) for the resource), b) the IAB-MT would transmit or receive, and the transmission or reception is not changed due to a use of the resource by the IAB-DU, (and the IAB-MT detects an availability indication or other control signaling with a field value of IA2 or INA1 (e.g., conditionally available or conditionally unavailable) for the resource), or c) the IAB-MT detects an availability indication or other control signaling with a field value of IA1 for the resource; and/or 3) if a resource is configured as unavailable, the resource state may not be used for a downlink transmission or uplink reception.

In some embodiments, there may be an availability indication acknowledgement and/or response. In various embodiments, an IAB system may have a tree topology or a directional acyclic graph ("DAG") topology. Tree and DAG topologies allow a top-down approach to resource management, starting from the IAB-CU, in the IAB donor, through parent nodes to child nodes and UEs. In this approach, an upstream node has an upper hand in controlling resources and a downstream node follows what the upstream node instructs. A main example of top-down resource management is the framework for soft resource configuration by the IAB-CU and availability indication by a parent node.

In various embodiments, an availability indication from a parent node PN to an IAB node N is a command that indicates an availability attribute for a resource (e.g., in time, frequency, spatial, or code domains) based on PN's assessment of whether the resource may or may not be used by PN, N, a child node of N, and so on. However, since PN may not be aware of the traffic demanded by N, quality of service priorities for the traffic, multiplexing and/or duplexing capability or applicability by N at a moment, and the like, PN may not necessarily be in the best position to decide, unilaterally, whether a resource is to be available for N.

Therefore, in certain embodiments, if an IAB node N receives an AI signaling from a parent node PN for a resource, N may respond by transmitting a control message indicating whether the availability indication for the resource may or may not be accommodated, accepted, rejected, or a like. The control message may be called an availability indication acknowledgement ("AI-ACK") or an availability indication response ("AI-RESP").

In some embodiments, an IAB node N receives an AI message from a parent node PN, wherein the AI message comprises one or multiple AI fields, each AI field indicating availability of a soft resource in time, frequency, spatial, and/or code domains. In response, N may transmit an AI-ACK message comprising an indication of whether the AI message is accepted. For example, the AI-ACK message may comprise a value of '1', or a positive ACK, indicating that the AI message is accepted or a value of '0', or a negative ACK, indicating that the AI message is not accepted.

In various embodiments, there may be different interpretations of the AI-ACK message. In one realization, in response to an AI-AK message from N, if the AI-ACK message comprises a field value indicating that an AI message associated with one or multiple soft resources is not accepted (e.g., a negative ACK), PN may assume that none of the availability indications in the AI message is accepted by N. Therefore, PN may not assume that N follows rules associated with availability of any of the soft resources, or lack thereof, as specified by the standard. Conversely, if the AI-ACK message from N comprises a field value indicating that the AI message is accepted (e.g., a positive ACK), PN may assume that N follows rules associated with availability of any of the soft resources, or lack thereof, as specified by a standard. According to this realization, if PN receives multiple AI-ACK messages in response to multiple AI messages indicating a same availability attribute and/or value for a same resource, PN may assume that the attribute and/or value is accepted by N if any of the AI-ACK messages comprises a positive ACK. For example, if PN indicates availability for a resource A and a resource B in AI message #1, and it indicates availability for a resource B and a resource C in AI message #2, then if PN receives a positive ACK in response to AI message #1 and a negative ACK in response to message #2, it may assume that the attribute/value indicated in message #1 is accepted for resource B. If a same attribute and/or value is indicated for resource B in AI message #1 and AI message #2, PN may assume that the attribute and/or value is accepted for resource B.

In some embodiments, by extension, for every attribute and/or value indicated for a resource, PN may assign a value of 1 if it receives a positive ACK and a value of 0 if it receives a negative ACK. Then, it may perform a logical OR operation on the values of {0, 1} for the said attribute and/or value indicated for the said resource in order to determine whether the said attribute and/or value is accepted by N for the said resource. Alternatively, PN may perform a logical AND operation on the values of {0, 1} for the said attribute/ value indicated for the said resource.

In another realization, if PN receives an AI-ACK message including a negative ACK, PN may assume that AI fields with a certain attribute and/or value is not accepted by N.

The said certain attribute and/or value may be any of IA, INA, IA1, IA2, INA1, or INA2.

In various embodiments, an AI-ACK message may include multiple field values associated with different attributes and/or values in the AI message or different resources associated with the AI message. In one realization, an AI-ACK message may include a bitmap of values '0' and '1', wherein each of the said values is associated with an availability indication attribute and/or value in the AI message. The attribute and/or value may be IA, INA, IA1, IA2, INA1, and/or INA2.

In certain embodiments, different interpretations of an AI-ACK message are possible. In one realization, a value of '1' or positive ACK may indicate that N accepts the associated attribute and/or value of availability, while a value of '0' or negative ACK may indicate that N does not accept the associated attribute/value of availability. If PN receives multiple values of '1' or '0' associated with an availability attribute and/or value associated with a resource, PN may determine whether the attribute/value is accepted by N for the resource by performing an OR operation on the multiple values. Alternatively, PN may perform an AND operation.

In some embodiments, an AI-ACK message may include multiple field values associated with different attributes and/or values in the AI message or different resources associated with the AI message, but the field values are not positive ACK or negative ACK values. Instead, the fields may take similar values as an AI message (e.g., is available (IA), is not available (INA), IA1, IA2, INA1, or INA2). For example, in the special case that N accepts all the availability attributes and/or values in the AI message, N may transmit an AI-ACK message including field values equal to the availability attributes/values in the AI message.

In some realizations, the format of the AI-ACK message may follow the format of the AI message. In certain realizations, an unsolicited AI-ACK message may be transmitted from N to PN in order to preempt the use of a resource or reserve availability of a resource for N.

Various embodiments may find an application in multi-parent or dual connectivity ("DC") scenarios. If an IAB node N has two parent nodes PN1 and PN2 and if PN1 and PN2 may control availability of overlapping resources, information of availability of a resource indicated by PN1, for example, may be useful for resource management by PN2. Therefore, if PN1 transmits an AI message to N, N may transmit an AI-ACK message to either or both PN1 and PN2. In this case, since the AI-ACK message is not in response to an AI message from PN2, PN2, may interpret the AI-ACK message as unsolicited.

In certain embodiments, such as in a DC or multi-parent scenario, rules may apply to availability of soft resources from multiple parent nodes when there is a mismatch between an availability attribute and/or value for a resource as indicated by a parent node PN1 versus another availability attribute and/or value for the said resource as indicated by another parent node PN2. For example, N may be able to reject an availability attribute and/or value indicated by a parent node only if it has a conflict with another availability attribute and/or value indicated by another parent node for a same resource.

In some embodiments, suppose that PN transmits an AI message including the values of (0, 1, 1, 0) for the resources (A, B, C, D) respectively. Further, a value of 1 means the associated resource is available (IA) and a value of 0 means that the associated resource is not available (INA). In one scenario, if N accepts all the availability values, it may transmit to PN an AI-ACK message including: 1) a value of 1 or positive ACK according to one embodiment; 2) values of (1, 1, 1, 1), according to another embodiment; and/or 3) values of (0, 1, 1, 0), according to a further embodiment. In another scenario, if N accepts the first two values (associated with resources A and B) and does not accept the second two values (associated with resources C and D), it may transmit to PN an AI-ACK message including: 1) a value of 0 or negative ACK, according to one embodiment; 2) values of (1, 1, 0, 0), according to another embodiment; and/or 3) values of (0, 1, 0, 1), according to a further embodiment. To accept or reject an attribute and/or value in an AI message, N may perform an XOR operation with a value of 0 or 1, respectively, and include the result of the operation in the AI-ACK message to PN.

In various embodiments, an AI-RESP may be similar to an AI-ACK, except that N may not necessarily transmit an AI-RESP message in response to an AI message. In this case, a default behavior may be assumed by PN. For example, PN may assume that N accepts all the attributes and/or values indicated in the AI message if PN does not receive an AI-RESP associated with the AI message.

In certain embodiments, an AI-ACK or AI-RESP message may be an L1 and/or L2 control signaling such as a UCI message or a MAC CE message. Alternatively, one or multiple values of positive ACK or negative ACK may be included (e.g., piggybacked), in another message to PN.

In some embodiments, an AI message and/or an associated AI-ACK or AI-RESP message may be subject to timing rules according to a configuration or a specification. For example, an AI-message, an AI-ACK message, or an AI-RESP message may need to be received prior to an associated resource by at least a threshold for the message to be applicable or effective. Then, if the message is received after the threshold, which may be associated with a decoding time capability, the message may be neglected for the resource. In one realization, if a message associated with resources A and B is received at a time that is later than a time associated with resource A minus a threshold time, but it is not later than a time associated with resource B minus the threshold time, the message is applicable or effective for resource B, but not for resource A. In another realization, the message is not effective for neither A nor B (e.g., the whole message is neglected by the receiving node).

In various embodiments, there may be an availability indication for a parent node and non-child nodes. A top-down approach for resource management in an IAB system with a tree or DAG topology provides only limited means to manage resources efficiently. Methods may be used for acknowledging or responding to an availability indication message whereby an IAB node may indicate to a parent node whether an availability attribute indicated for a resource is accepted by the IAB node. Certain methods extend the IAB node's options to manage the available resources in a way that does not strictly follow a top-down approach.

In certain embodiments, methods are used that extend the resource management possibilities yet further by allowing IAB nodes to communicate with other nodes that may or may not be adjacent topologically, but their use of radio resources may be correlated. For example, two IAB nodes may be in a geographical vicinity, but neither may be a parent node or a child node of the other.

In some embodiments, an IAB node N node may transmit an AI message to a parent node PN. This AI message may be called an "uplink" AI message, which may be transmitted as a UCI or a MC CE message.

In various embodiments, a format of an uplink AI message may be similar to that of a "downlink" AI message (e.g., an AI message to an IAB node from a parent node). The associated behavior by the parent node if receiving an uplink AI message may be similar to the behavior of an IAB node receiving a downlink AI message.

In certain embodiments, an AI message from N to PN may be interpreted as a request, which may or may not be accepted by PN. In this case, the AI message may, alternatively, be called an AI request ("AI-REQ"). Then, PN may respond to N by transmitting an AI-ACK or AI-RESP message, which may follow a similar format and behavior as the methods proposed earlier for acknowledging or responding to an AI message from PN to N.

In some embodiments, a request-response signaling may be realized by N transmitting an unsolicited AI-ACK or AI-RESP to PN. The format of the AI-ACK or AI-RESP may follow that of another embodiment. Then, PN may react by transmitting an AI message to N, wherein the AI message indicates which resources are or are not available to N.

In various embodiments, an IAB node N1 may indicate availability of a resource to another IAB node N2, wherein N1 and N2 may not be connected by a Uu link.

In certain embodiments, a signaling may be performed through an F1 interface, possibly over multiple backhaul links (e.g., hops). These embodiments may be useful for communication among IAB nodes configured by a same IAB donor. In this case, information of soft resource configurations may be shared among the IAB nodes by the IAB donor.

In some embodiments, a signaling may be over the air ("OTA"), wherein availability indication or request may be performed in a signal that may be received over the air without a direct Uu link connection. Examples of the signal are reference signals or a system information block ("SIB") broadcast by N1. An IAB-CU may configure the signal and determine interpretation and behavior of N2.

In various embodiments, a resource may be in the time domain, frequency domain, spatial domain, code domain, or a combination thereof. Examples of a resource in the time domain are one or multiple symbols, one or multiple slots, a duration in milliseconds, and the like. Examples of a resource in the frequency domain are one or multiple PRBs, one or multiple RBGs, a BWP, a CC, and the like. Examples of a resource in the spatial domain are a beam, a TCI state, a spatial relation info, a reference signal index, a CSI-RS resource indicator ("CRI"), an SRI, an SSB index, and the like. In certain embodiments, a resource in the spatial domain may be an antenna or an antenna port. In some embodiments, a resource in the spatial domain may be indicated implicitly in association with a resource in the time and/or frequency domains. Examples of a resource in the code domain is a sequence such as a reference signal sequence.

It should be noted, however, that there is a difference between how a signal is defined in time-frequency domains and how the spatial domain is addressed by the standard through definitions of spatial relations, quasi-collocation, and so forth. Therefore, despite frequent references to "resources" in the spatial domain herein, it should be noted that the methods, as may be specified in the standard, may not refer to beams, spatial relations, QCL relations, and the like as resources.

In certain embodiments, reference is made to multiplexing and/or duplexing capability or applicability for simultaneous operation by an IAB-DU and an IAB-MT of an IAB node. The capability or applicability may be assessed continuously by the IAB node to determine a behavior for using a beam or a resource based on the methods herein.

In some embodiments, it is expected that an IAB-CU configuring an IAB can be made aware of capabilities of IAB nodes in the system through RRC messages sent on an F1 interface. Those may include capabilities related to enhanced duplexing and simultaneous operations. Examples of such capabilities include a number of antenna panels, a number of antenna panels for upstream, a number of antenna panels for downstream, a beamforming capability, an FDM and/or SDM capability, a number of discrete Fourier transform ("DFT") and/or inverse DFT ("IDFT") windows, and so forth. This information may be required or helpful for the IAB-CU to configure resources properly for the IAB nodes. The IAB-CU may further be informed of topological changes in the IAB system, mobility of IAB nodes, changes in a large-scale interference level, and so forth, based on which the IAB-CU may change resource configurations. Subsequently, the IAB-CU may inform IAB nodes of capabilities associated with other IAB nodes such as a parent node of child node. The communications may occur on an F1 interface and in the form of RRC configuration IEs.

In various embodiments, RRC signaling over an F1 interface may not be sufficient for short-scale changes in the capability of an IAB node to perform simultaneous operation, especially in a multi-hop IAB system where communicating RRC messages from an IAB node to the IAB-CU and then from the IAB-CU to another node may cause a significant delay. Therefore, direct control signaling between IAB nodes may be used to inform other nodes of an instantaneous ability of an IAB node to perform simultaneous operations.

In certain embodiments, an L1 and/or L2 control message from an IAB node to a parent node serving the IAB node or a child node served by the IAB node may inform the parent and/or child node of the IAB node's ability to perform a simultaneous operation. This "short-scale" capability indication may be determined by a hardware capability such as a number of antenna panels, a power constraint, an interference constraint, a beamforming/spatial constraint, a timing alignment constraint, or the like. In one realization, the control message may carry one bit of information indicating whether the IAB node is capable of performing simultaneous operation at the present time. In another realization, the control message may further indicate whether it can perform a simultaneous operation based on a beamforming and/or spatial constraint, a power constraint, an interference constraint, a timing constraint, and so forth. Particularly, the IAB node may be able to perform a simultaneous operation based on a spatial filter, a TX and/or RX power range, an interference threshold, or a timing alignment scheme at one time, but it may be unable to do so at another time. In yet another realization, the control message may include information of a type of simultaneous operation the IAB node is capable of. For example, the IAB node may be able to perform half-duplex simultaneous TX or simultaneous RX, but it may be unable to perform a full-duplex operation based on a hardware capability or an operation constraint (e.g., spatial, power, interference, timing, and so forth).

In some embodiments, a control message may be periodic. In another embodiment, the control message may be transmitted upon demand, for example, in response to a soliciting control signaling or only if the IAB node is temporarily deviating from a capability it has indicated earlier (e.g., due to an operation constraint).

In various embodiments, simultaneous may be based on "best effort." Despite an IAB node's capability to perform simultaneous operation, the capability may be disrupted temporarily due to a constraint during the operation. In such embodiments, a best-effort approach may be taken by the IAB system or an IAB node to perform simultaneous operations only when they are possible. For example, an IAB node may be configured or indicated to use a time-frequency resource in a direction, for example, for a DL or UL communication. Then, the IAB node may use the resource in the configured and/or indicated direction. Additionally, if the IAB node is capable of performing an upstream or downstream communication simultaneously based on its hardware capabilities and while considering operation constraints, the IAB node may choose to schedule a communication and/or indicate to an adjacent node to expect a communication on the resource or a time-overlapping ("TOL") resource.

In certain embodiments, an IAB node performing simultaneous operations based on a best-effort approach may inform adjacent nodes, either a parent and/or child node or a node in a physical vicinity, of its intention to perform a communication other than one configured or indicated to the IAB nodes. This control signaling may inform the adjacent nodes of upcoming communications and may allow them to take an action accordingly, for example, to perform beamforming or mitigate interference. In an embodiment, an IAB node may perform a simultaneous operation based on a best-effort approach only on certain symbols. The symbols may be configured or indicated to be usable for simultaneous operation based on a best-effort approach.

Specifically, in some embodiments, only resources configured or indicated flexible (F) may be used for a simultaneous operation based on a best-effort approach.

The following signaling mechanisms in NR enable communicating DL and/or UL information of an OFDM symbol to a UE: 1) semi-static RRC signaling; 2) dynamic slot format indication ("SFI") shared by a group of UEs; and/or 3) dynamic signaling to schedule a channel for a UE.

In various embodiments, configurations or signaling for an IAB-MT or an IAB-DU may be used. For an IAB-MT, the configuration or signaling may be received by the IAB node from an IAB-CU or a parent node serving the IAB node. For example, if a description reads "an IAB-MT is configured by a resource configuration," it means the IAB node including the IAB-MT has received the resource configuration for the IAB-MT. Similarly, for an IAB-DU, the configuration or signaling may be received by the IAB node from an IAB-CU or a parent node serving the IAB node. Alternatively, the configuration or signaling may be received by a child node served by the IAB-DU, in which case the IAB-DU may also be informed of the configuration or signaling to the child node. For example, if a description reads "an IAB-DU is configured by a resource e configuration," it may mean a child node (or a UE or an enhanced UE) served by the IAB-DU has received the resource configuration, in which case the IAB node comprising the IAB-DU may also be informed of the resource configuration. In each of the above cases, a configuration or signaling may be received from an IAB-CU on an F1 interface. In each of the above cases, a control signaling may be received from a parent node or a child node on a physical control channel or by a MAC message.

In certain embodiments, SDM may refer to a scenario where the same frequency resources are used for multiple operations that are multiplexed in the spatial domain (e.g., by multiple antenna panels and/or multiple beams). In each embodiment, FDM may refer to a scenario where different frequency resources are used for multiple operations that may or may not be multiplexed in a spatial domain. The focus of these embodiments is reusing time resources, although TDM is not precluded, possibly in combination of SDM and/or FDM. As such, combination of SDM and FDM and possible combination with other multiplexing schemes such as CDM is not precluded.

In some embodiments, SDM may refer to multi-panel operation where multiple antennas, antenna panels, antenna ports, and so forth may be used for multiplexing communications.

In various embodiments, resource configurations may include TDD-UL-DL-ConfigCommon and TDD-UL-DL-ConfigDedicated as well as TDD-UL-DL-ConfigDedicated-IAB-MT-r16. Furthermore, RRC IEs may be used, which may be called TDD-UL-DL-ConfigDedicated2-r17 or TDD-UL-DL-ConfigDedicated2-IAB-MT-r17, for example.

In certain embodiments, reference is frequently made to time-overlapping ("TOL") resources such as TOL symbols, although the standard specification may use a different term for overlapping resources or simply refer to "same" resources. One reason for this definition is to clarify that TOL resources may be defined or configured for different entities, such as different IAB nodes, an IAB-MT and IAB-DU of an IAB node, and so forth. Another reason is to cover cases with different numerologies where a symbol in a first operation and/or configuration may not have the same length in time as a symbol in a second operation and/or configuration. Yet another reason is to cover cases that a timing misalignment, whether deliberate due to employing different timing alignments or due to an error. It should be noted that TOL as a relationship between two resources is commutative—if a first resource and/or symbol A is time-overlapping with a second resource and/or symbol B, then B is also TOL with A. Description of the embodiments may make references to a symbol in a first operation and/or configuration and a TOL symbol in a second operation and/or configuration.

As found herein, an "operation" may refer to a transmission ("TX") of a signal or a reception ("RX") of signal. In this context, a simultaneous operation may refer to simultaneous transmissions, simultaneous receptions, or simultaneous transmissions and receptions by two communication entities. In certain embodiments, the two entities may belong to a same node such as an IAB node. In some embodiments, the two entities may be an IAB-MT and an IAB-DU of an IAB node.

Finally, although embodiments are described for symbols, such as OFDM symbols, as a unit of time resources, the embodiments can be extended to other units such as slots, mini-slots, subframes, a group of symbols such as all the DL, UL, or F symbols in a slot or a group of slots, and so forth. Furthermore, the embodiments may be extended to the frequency domain (e.g., with a unit of resource element, resource block, sub-channel, and so forth) or other domains.

In some embodiments, for Case A duplexing, which is simultaneous IAB-MT TX (UL) and IAB-DU TX (DL), the following may be applicable Simultaneous TX capability: this may refer to an IAB node's capability to perform simultaneous transmissions, which may indicate that the IAB node is capable of SDM and/or FDM, the IAB node has multiple antenna panels (e.g., SDM), the IAB node is capable of simultaneous transmissions in DL and UL, the IAB node is capable of enhanced duplexing, or a like. In the case of configuration-based methods, information of the capability may be sent to an IAB-CU that configures the system. In the case of methods based on control signaling, the information of the capability may be sent to another IAB node such as a parent node or a child node.

Power imbalance constraint: this may refer to a constraint according to which the difference between a TX powers for an IAB-MT TX and an IAB-DU TX is not larger than a threshold. The threshold may be determined by an IAB node capability that specifies a maximum power imbalance on one panel (e.g., FDM) or among multiple panels (e.g., SDM). In the case of configuration-based methods, a power imbalance constraint may be satisfied by semi-static configuration of TX powers. In the case of methods based on control signaling, a TX power for an IAB-MT TX may be determined by a parent node serving the IAB-MT. Therefore, a power imbalance constraint may require an IAB node to adjust a TX power for an IAB-DU TX, if possible, or decline a transmission otherwise.

Total power constraint: this may refer to a constraint according to which the total TX power for an IAB-MT TX and an IAB-DU TX does not exceed a threshold. The threshold may be determined by an IAB node capability that specifies a maximum total power for a panel (e.g., FDM) or for the IAB node (e.g., SDM), by a regulatory limit, or the like. In the case of configuration-based methods, a total power constraint may be satisfied by semi-static configuration of TX powers. In the case of methods based on control signaling, a TX power for an IAB-MT TX may be determined by a parent node serving the IAB-MT. Therefore, a total power constraint may require an IAB node to adjust a TX power for an IAB-DU TX, if possible, or decline a transmission otherwise.

Interference constraint: this may refer to a variety of interference constraints between antennas of an IAB node (e.g., self-interference), interference on other nodes or channels or cells, and so on. In some embodiments, according to an interference constraint, the interference by an IAB-DU TX on a parent node should be below a threshold when the parent node performs beamforming for receiving a signal from the IAB-MT. In various embodiments, according to an interference constraint, the interference by the IAB-MT TX on a child node should be below a threshold when the child node performs beamforming for receiving a signal from the IAB-DU.

Guard band constraint: this may refer to a constraint according to which the frequency resources (e.g., PRBs) allocated to the IAB-MT is separated from the frequency resources allocated to the IAB-DU by at least a threshold called a guard band. A value of the guard band may be determined by an IAB node capability for one panel (e.g., FDM) or among multiple panels (e.g., SDM). In the case of configuration-based methods, a resource may be allocated by a configuration. In the case of methods based on control signaling, a resource may be allocated by control message such as an L1 and/or L2 message.

Spatial constraint (e.g., FDM): this may refer to a constraint according to which a beam (e.g., spatial filter) for transmitting a signal is constrained by a beam (e.g., spatial filter) for transmitting another signal. A common case for this constraint is when one or multiple antenna panels are controlled by a same circuitry for controlling beamforming. In this case, if the one or multiple panels are beamformed to transmit a first signal in a particular direction in the spatial domain, any second signal may be constrained to be transmitted with a same beamforming configuration if the same one or multiple panels is to be used. Whether a spatial constraint applies to an IAB node or an antenna panel of an IAB node may be determined by a capability of the IAB node, which may be communicated to an IAB-CU (e.g., in the case of configuration-based methods) or another IAB node such as a parent node or a child node (e.g., in the case of methods based on control signaling).

Timing alignment constraint (e.g., FDM): this constraint may be applicable if the antenna panel is connected to a baseband processor with one DFT and/or IDFT window. In this case, the timing for an IAB-MT TX and an IAB-DU TX should be aligned at least at a symbol level. The timing alignment may correspond to a Case-6 timing scheme as specified by the standard, configured by the network, signaled by a parent node, and so forth.

In various embodiments, for Case B duplexing, which is simultaneous IAB-MT RX (e.g., DL) and IAB-DU RX (e.g., UL), the following may be applicable:

Simultaneous RX capability: this may refer to an IAB node's capability to perform simultaneous receptions, which may indicate that the IAB node is capable of SDM and/or FDM, the IAB node has multiple antenna panels (e.g., SDM), the IAB node is capable of simultaneous receptions in DL and UL, the IAB node is capable of enhanced duplexing, or the like. In the case of configuration-based methods, information of the capability may be sent to an IAB-CU that configures the system. In the case of methods based on control signaling, the information of the capability may be sent to another IAB node such as a parent node or a child node.

Power imbalance constraint: this may refer to a constraint according to which the difference between RX powers for an IAB-MT RX and an IAB-DU RX is not larger than a threshold. The threshold may be determined by an IAB node capability that specifies a maximum power imbalance on one panel (e.g., FDM) or among multiple panels (e.g., SDM). In the case of configuration-based methods, a power imbalance constraint may be satisfied by semi-static configuration of TX powers. In the case of methods based on control signaling, a TX power for a child node TX may be determined by an IAB-DU serving the child node. Therefore, a power imbalance constraint may require a parent node to adjust a TX power for a parent node TX, if possible, or decline a transmission otherwise. Alternatively, an IAB-DU may need to signal a child node to adjust its TX power in order to satisfy a power imbalance constraint while the RX power from a parent node serving an IAB-MT is determined or known by the IAB node.

Interference constraint: this may refer to a variety of interference constraints between antennas of an IAB node (e.g., self-interference), interference on other nodes or channels or cells, and so on. In some embodiments, according to an interference constraint, the interference by a child node on an IAB-MT RX should be below a threshold when the IAB-MT performs beamforming for receiving a signal from a parent node. In some embodiments, according to an interference constraint, the interference by a parent node on an IAB-DU RX should be below a threshold if the IAB-DU performs beamforming for receiving a signal from a child node.

Guard band constraint: this may refer to a constraint according to which the frequency resources (e.g., PRBs) allocated to the IAB-MT is separated from the frequency resources allocated to the IAB-DU by at least a threshold called a guard band. A value of the guard band may be determined by an IAB node capability for one panel (e.g., FDM) or among multiple panels (e.g., SDM). In the case of configuration-based methods, a resource may be allocated by a configuration. In the case of methods based on control signaling, a resource may be allocated by control message such as an L and/or L2 message.

Spatial constraint (e.g., FDM): this may refer to a constraint according to which a beam (e.g., spatial filter) for receiving a signal is constrained by a beam (e.g., spatial filter) for receiving another signal. A common case for this constraint is when one or multiple antenna panels are controlled by a same circuitry for controlling beamforming. In this case, if the one or multiple panels are beamformed to receive a first signal in a particular direction in the spatial domain, any second signal may be constrained to be received with a same beamforming configuration if the same one or multiple panels is to be used. Whether a spatial constraint applies to an IAB node or an antenna panel of an IAB node may be determined by a capability of the IAB node, which may be communicated to an IAB-CU (e.g., in the case of configuration-based methods) or another IAB node such as a parent node or a child node (e.g., in the case of methods based on control signaling).

Timing alignment constraint (e.g., FDM): this constraint may be applicable if the antenna panel is connected to a baseband processor with one DFT and/or IDFT window. In this case, the timing for an IAB-MT RX and an IAB-DU RX should be aligned at least at a symbol level. The timing alignment may correspond to a Case-7 timing scheme as specified by the standard, configured by the network, signaled by a parent node, and so forth.

For Case C duplexing, which is simultaneous IAB-MT TX (e.g., UL) and IAB-DU RX (e.g., UL), and Case D duplexing, which is simultaneous IAB-MT RX (DL) and IAB-DU TX (DL), the following may be applicable:

Simultaneous TX and/or RX capability: this may refer to an IAB node's capability to perform simultaneous transmission and reception, which may indicate that the IAB node is capable of SDM and/or FDM, the IAB node has multiple antenna panels (e.g., SDM), the IAB node is capable of simultaneous transmission and reception in DL and UL, the IAB node is capable of enhanced duplexing, or the like. In the case of configuration-based methods, information of the capability may be sent to an IAB-CU that configures the system. In the case of methods based on control signaling, the information of the capability may be sent to another IAB node such as a parent node or a child node.

Interference constraint: this may refer to a variety of interference constraints between antennas of an IAB node (e.g., self-interference), interference on other nodes or channels or cells, and so on. In some embodiments, according to an interference constraint, the interference by a child node on a parent node RX should be below a threshold when the parent node performs beamforming for receiving a signal from an IAB-MT. For Case C, according to an interference constraint, the interference by an IAB-MT on an IAB-DU RX should be below a threshold when the IAB-DU performs beamforming for receiving a signal from a child node. For Case D, according to an interference constraint, the interference by an IAB-DU on an IAB-MT RX should be below a threshold when the IAB-MT performs beamforming for receiving a signal from a parent node.

Guard band constraint: this may refer to a constraint according to which the frequency resources (e.g., PRBs) allocated to the IAB-MT is separated from the frequency resources allocated to the IAB-DU by at least a threshold called a guard band. A value of the guard band may be determined by an IAB node capability for one panel (e.g., FDM) or among multiple panels (e.g., SDM). In the case of configuration-based methods, a resource may be allocated by a configuration. In the case of methods based on control signaling, a resource may be allocated by control message such as an L1 and/or L2 message.

In some embodiments, the terms antenna, panel, and antenna panel are used interchangeably. An antenna panel may be hardware that is used for transmitting and/or receiving radio signals at frequencies lower than 6 GHz (e.g., frequency range 1 ("FR1")), or higher than 6 GHz (e.g., frequency range 2 ("FR2") or millimeter wave ("mm-Wave")). In certain embodiments, an antenna panel may include an array of antenna elements. Each antenna element may be connected to hardware, such as a phase shifter, that enables a control module to apply spatial parameters for transmission and/or reception of signals. The resulting radiation pattern may be called a beam, which may or may not be unimodal and may allow the device to amplify signals that are transmitted or received from spatial directions.

In various embodiments, an antenna panel may or may not be virtualized as an antenna port. An antenna panel may be connected to a baseband processing module through a radio frequency ("RF") chain for each transmission (e.g., egress) and reception (e.g., ingress) direction. A capability of a device in terms of a number of antenna panels, their duplexing capabilities, their beamforming capabilities, and so forth, may or may not be transparent to other devices. In some embodiments, capability information may be communicated via signaling or capability information may be provided to devices without a need for signaling. If information is available to other devices the information may be used for signaling or local decision making.

In some embodiments, a UE antenna panel may be a physical or logical antenna array including a set of antenna elements or antenna ports that share a common or a significant portion of a radio frequency ("RF") chain (e.g., in-phase and/or quadrature ("I/Q") modulator, analog to digital ("A/D") converter, local oscillator, phase shift network). The UE antenna panel or UE panel may be a logical entity with physical UE antennas mapped to the logical entity. The mapping of physical UE antennas to the logical entity may be up to UE implementation. Communicating (e.g., receiving or transmitting) on at least a subset of antenna elements or antenna ports active for radiating energy (e.g., active elements) of an antenna panel may require biasing or powering on of an RF chain which results in current drain or power consumption in a UE associated with the antenna panel (e.g., including power amplifier and/or low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In certain embodiments, depending on a UE's own implementation, a "UE panel" may have at least one of the following functionalities as an operational role of unit of antenna group to control its transmit ("TX") beam independently, unit of antenna group to control its transmission power independently, and/pr unit of antenna group to control its transmission timing independently. The "UE panel" may be transparent to a gNB. For certain conditions, a gNB or network may assume that a mapping between a UE's physical antennas to the logical entity "UE panel" may not be changed. For example, a condition may include until the next update or report from UE or include a duration of time over which the gNB assumes there will be no change to mapping. A UE may report its UE capability with respect to the "UE panel" to the gNB or network. The UE capability may include at least the number of "UE panels." In one embodiment, a UE may support UL transmission from one beam within a panel. With multiple panels, more than one beam (e.g., one beam per panel) may be used for UL transmission. In another embodiment, more than one beam per panel may be supported and/or used for UL transmission.

In some embodiments, an antenna port may be defined such that a channel over which a symbol on the antenna port is conveyed may be inferred from the channel over which another symbol on the same antenna port is conveyed.

In certain embodiments, two antenna ports are said to be quasi co-located ("QCL") if large-scale properties of a channel over which a symbol on one antenna port is conveyed may be inferred from the channel over which a symbol on another antenna port is conveyed. Large-scale properties may include one or more of delay spread, Doppler spread, Doppler shift, average gain, average delay, and/or spatial receive ("RX") parameters. Two antenna ports may be quasi co-located with respect to a subset of the large-scale properties and different subset of large-scale properties may be indicated by a QCL Type. For example, a qcl-Type may take one of the following values: 1) 'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; and 4) 'QCL-TypeD': {Spatial Rx parameter}. Other QCL-Types may be defined based on combination of one or large-scale properties.

In various embodiments, spatial RX parameters may include one or more of: angle of arrival ("AoA"), dominant AoA, average AoA, angular spread, power angular spectrum ("PAS") of AoA, average angle of departure ("AoD"), PAS of AoD, transmit and/or receive channel correlation, transmit and/or receive beamforming, and/or spatial channel correlation.

In certain embodiments, QCL-TypeA, QCL-TypeB, and QCL-TypeC may be applicable for all carrier frequencies, but QCL-TypeD may be applicable only in higher carrier frequencies (e.g., mmWave, FR2, and beyond), where the UE may not be able to perform omm-directional transmission (e.g., the UE would need to form beams for directional transmission). For a QCL-TypeD between two reference signals A and B, the reference signal A is considered to be spatially co-located with reference signal B and the UE may assume that the reference signals A and B can be received with the same spatial filter (e.g., with the same RX beamforming weights).

In some embodiments, an "antenna port" may be a logical port that may correspond to a beam (e.g., resulting from beamforming) or may correspond to a physical antenna on a device. In certain embodiments, a physical antenna may map directly to a single antenna port in which an antenna port corresponds to an actual physical antenna. In various embodiments, a set of physical antennas, a subset of physical antennas, an antenna set, an antenna array, or an antenna sub-array may be mapped to one or more antenna ports after applying complex weights and/or a cyclic delay to the signal on each physical antenna. The physical antenna set may have antennas from a single module or panel or from multiple modules or panels. The weights may be fixed as in an antenna virtualization scheme, such as cyclic delay diversity ("CDD"). A procedure used to derive antenna ports from physical antennas may be specific to a device implementation and transparent to other devices.

In certain embodiments, a transmission configuration indicator ("TCI") state ("TCI-state") associated with a target transmission may indicate parameters for configuring a quasi-co-location relationship between the target transmission (e.g., target RS of demodulation ("DM") reference signal ("RS") ("DM-RS") ports of the target transmission during a transmission occasion) and a source reference signal (e.g., synchronization signal block ("SSB"), CSI-RS, and/or sounding reference signal ("SRS")) with respect to quasi co-location type parameters indicated in a corresponding TCI state. The TCI describes which reference signals are used as a QCL source, and what QCL properties may be derived from each reference signal. A device may receive a configuration of a plurality of transmission configuration indicator states for a serving cell for transmissions on the serving cell. In some embodiments, a TCI state includes at least one source RS to provide a reference (e.g., UE assumption) for determining QCL and/or a spatial filter.

In some embodiments, spatial relation information associated with a target transmission may indicate a spatial setting between a target transmission and a reference RS (e.g., SSB, CSI-RS, and/or SRS). For example, a UE may transmit a target transmission with the same spatial domain filter used for receiving a reference RS (e.g., DL RS such as SSB and/or CSI-RS). In another example, a UE may transmit a target transmission with the same spatial domain transmission filter used for the transmission of a RS (e.g., UL RS such as SRS). A UE may receive a configuration of multiple spatial relation information configurations for a serving cell for transmissions on a serving cell.

In various embodiments described herein, although entities are referred to as IAB nodes, the same embodiments can be applied to IAB donors (e.g., which are the IAB entities connecting the core network to the IAB network) with minimum or zero modifications. Moreover, different steps described for different embodiments may be permuted. Further, each configuration may be provided by one or more configurations in practice. An earlier configuration may provide a subset of parameters while a later configuration may provide another subset of parameters. In certain embodiments, a later configuration may override values provided by an earlier configuration or a pre-configuration.

In some embodiments, a configuration may be provided by radio resource control ("RRC") signaling, medium-access control ("MAC") signaling, physical layer signaling such as a downlink control information ("DCI") message, a combination thereof, or other methods. A configuration may include a pre-configuration or a semi-static configuration provided by a standard, by a vendor, and/or by a network and/or operator. Each parameter value received through a configuration or indication may override previous values for a similar parameter.

In various embodiments, despite frequent references to IAB, embodiments herein may be applicable to wireless relay nodes and other types of wireless communication entities. Further, layer 1 ("L1") and/or layer 2 ("L2") control signaling may refer to control signaling in layer 1 (e.g., physical layer) or layer 2 (e.g., data link layer). Particularly, an L1 and/or L2 control signaling may refer to an L1 control signaling such as a DCI message or an uplink control information ("UCI") message, an L2 control signaling such as a MAC message, or a combination thereof. A format and an interpretation of an L1 and/or L2 control signaling may be determined by a standard, a configuration, other control signaling, or a combination thereof.

It should be noted that any parameter discussed in this disclosure may appear, in practice, as a linear function of that parameter in signaling or specifications.

In various embodiments, vendor manufacturing IAB systems and/or devices and an operator deploying the IAB systems and/or devices may be allowed to negotiate capabilities of the systems and/or devices. This may mean that some of the information assumed to need signaling between entities may readily be available to the devices, for example, by storing the information on a memory unit such as a read-only memory ("ROM"), exchanging the information by proprietary signaling methods, providing the information by a (pre)configuration, or otherwise taking the information into account when creating hardware and/or software of the IAB systems and/or devices or other entities in the network. In certain embodiments, embodiments described herein that include exchanging information may be extended to similar embodiments wherein the information is obtained by other embodiments.

Further, embodiments used for an IAB mobile terminal ("MT") ("IAB-MT") may be adopted by a UE as well. If an embodiment uses a capability that is not supported by a legacy UE, a UE enhanced to possess the capability may be used. In this case, the UE may be referred to as an enhanced UE or an IAB-enhanced UE and may convey its information of its enhanced capability to the network for proper configuration and operation.

As used herein, a node or a wireless node may refer to an IAB node, an IAB-DU, an IAB-MT, a UE, a base station ("BS"), a gNodeB ("gNB"), a transmit-receive point ("TRP"), an IAB donor, and so forth. The embodiments herein with an emphasis on a type of nodes are not meant to limit scope.

As used herein, "HARQ-ACK" may represent collectively the positive acknowledge ("ACK") and the negative acknowledge ("NACK" or "NAK"). ACK means that a transport block ("TB") is correctly received while NACK (or NAK) means a TB is erroneously received.

Figure 26:
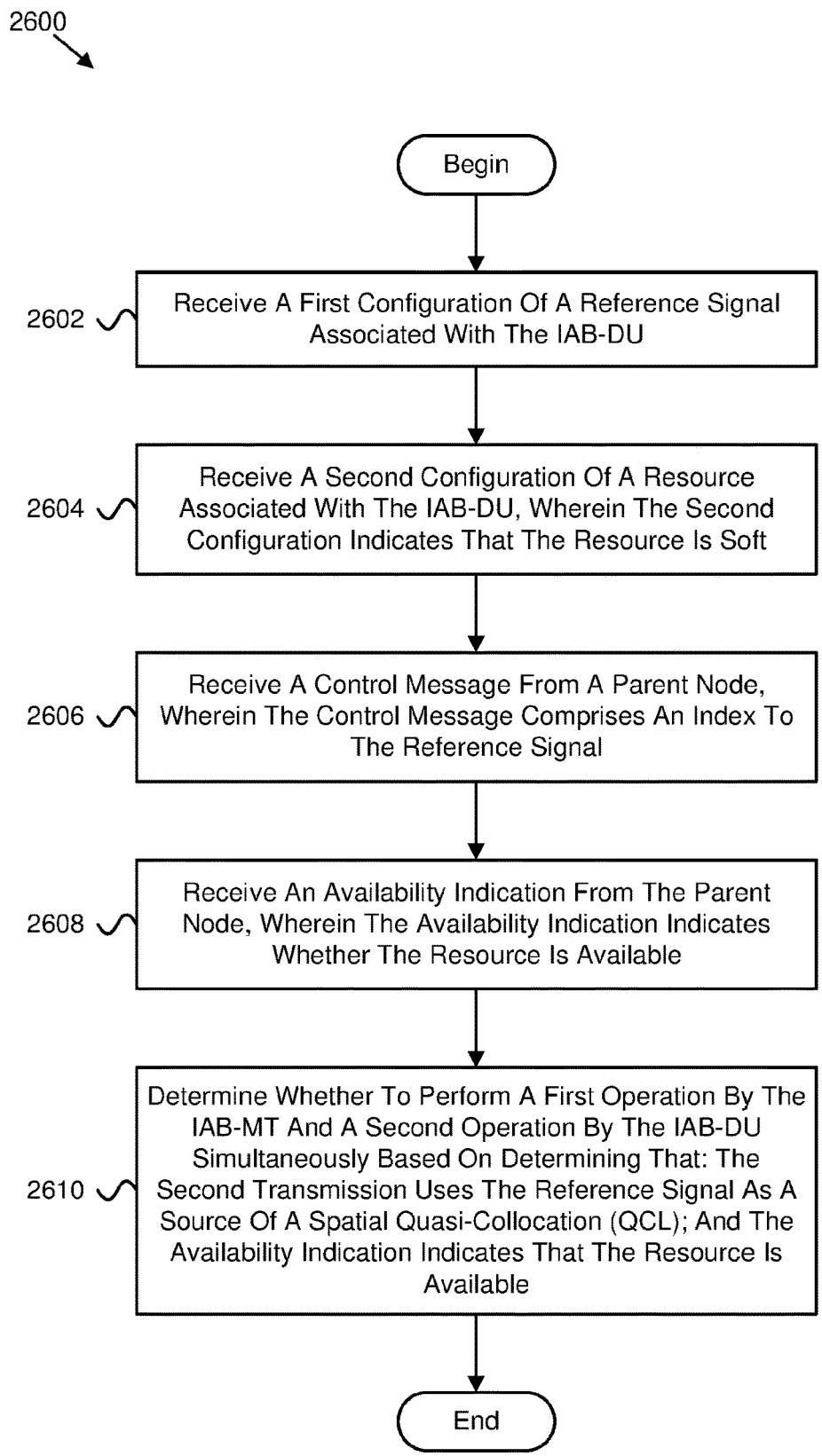
FIG. 26 is a flow chart diagram illustrating one embodiment of a method for an integrated access and backhaul node configuration.

FIG. 26 is a flow chart diagram illustrating one embodiment of a method 2600 for an integrated access and backhaul node configuration. In some embodiments, the method 2600 is performed by an apparatus, such as the network unit 104. In certain embodiments, the method 2600 may be performed by a processor executing program code, for example, a microcontroller, a microprocessor, a CPU, a GPU, an auxiliary processing unit, a FPGA, or the like.

In various embodiments, the method 2600 includes receiving 2602, at an integrated access and backhaul (IAB) node including an IAB mobile terminal (IAB-MT) and an IAB distributed unit (IAB-DU), a first configuration of a reference signal associated with the IAB-DU. In some embodiments, the method 2600 includes receiving 2604 a second configuration of a resource associated with the IAB-DU. The second configuration indicates that the resource is soft. In certain embodiments, the method 2600 includes receiving 2606 a control message from a parent node. The control message includes an index to the reference signal. In various embodiments, the method 2600 includes receiving 2608 an availability indication from the parent node. The availability indication indicates whether the resource is available. In some embodiments, the method 2600 includes determining 2610 whether to perform a first operation by the IAB-MT and a second operation by the IAB-DU simultaneously based on determining that: the second transmission uses the reference signal as a source of a spatial quasi-collocation (QCL); and the availability indication indicates that the resource is available.

In certain embodiments, the first configuration comprises a channel state information reference signal (CSI-RS) configuration or a transmission configuration indication (TCI) configuration. In some embodiments, the resource comprises a symbol or a group of resource blocks (RBs). In various embodiments, the control message comprises a medium access control (MAC) message.

In one embodiment, the spatial QCL comprises a QCL Type D. In certain embodiments: the first operation is a first transmission or a first reception; and the second operation is a second transmission or a second reception.

Figure 27:
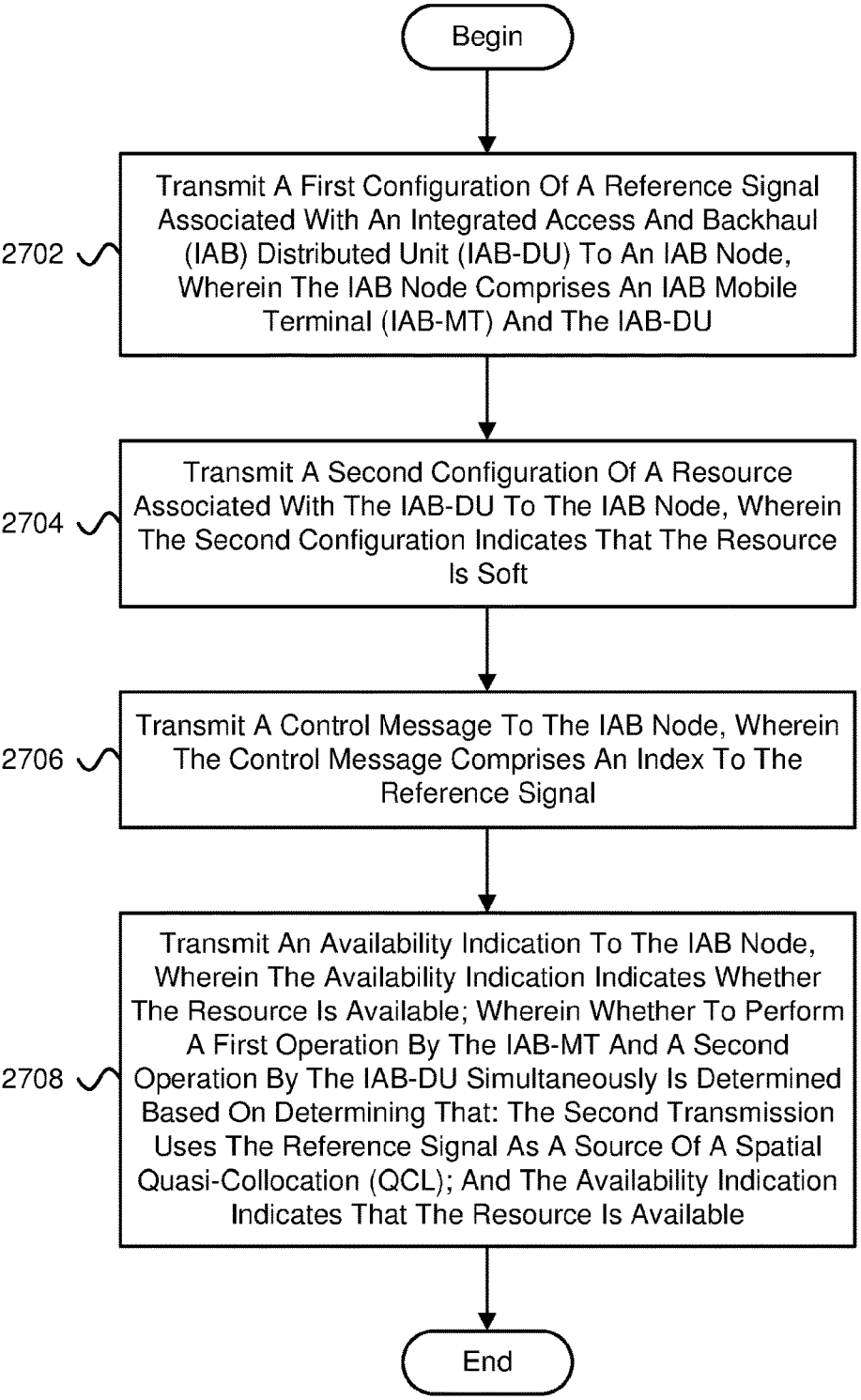
FIG. 27 is a flow chart diagram illustrating another embodiment of a method for an integrated access and backhaul node configuration.

FIG. 27 is a flow chart diagram illustrating another embodiment of a method 2700 for an integrated access and backhaul node configuration. In some embodiments, the method 2700 is performed by an apparatus, such as the network unit 104. In certain embodiments, the method 2700 may be performed by a processor executing program code, for example, a microcontroller, a microprocessor, a CPU, a GPU, an auxiliary processing unit, a FPGA, or the like.

In various embodiments, the method 2700 includes transmitting 2702, from a parent node, a first configuration of a reference signal associated with an integrated access and backhaul (IAB) distributed unit (IAB-DU) to an IAB node. The IAB node includes an IAB mobile terminal (IAB-MT) and the IAB-DU. In some embodiments, the method 2700 includes transmitting 2704 a second configuration of a resource associated with the IAB-DU to the IAB node. The second configuration indicates that the resource is soft. In certain embodiments, the method 2700 includes transmitting 2706 a control message to the IAB node. The control message includes an index to the reference signal. In various embodiments, the method 2700 includes transmitting 2708 an availability indication to the IAB node. The availability indication indicates whether the resource is available. Whether to perform a first operation by the IAB-MT and a second operation by the IAB-DU simultaneously is determined based on determining that: the second transmission uses the reference signal as a source of a spatial quasi-collocation (QCL); and the availability indication indicates that the resource is available.

In certain embodiments, the first configuration comprises a channel state information reference signal (CSI-RS) configuration or a transmission configuration indication (TCI) configuration. In some embodiments, the resource comprises a symbol or a group of resource blocks (RBs). In various embodiments, the control message comprises a medium access control (MAC) message.

In one embodiment, the spatial QCL comprises a QCL Type D. In certain embodiments: the first operation is a first transmission or a first reception; and the second operation is a second transmission or a second reception.

In one embodiment, an apparatus comprises an integrated access and backhaul (IAB) node comprising an IAB mobile terminal (IAB-MT) and an IAB distributed unit (IAB-DU). The apparatus further comprises: a receiver that: receives a first configuration of a reference signal associated with the IAB-DU; receives a second configuration of a resource associated with the IAB-DU, wherein the second configuration indicates that the resource is soft; receives a control message from a parent node, wherein the control message comprises an index to the reference signal; and receives an availability indication from the parent node, wherein the availability indication indicates whether the resource is available; and a processor that determines whether to perform a first operation by the IAB-MT and a second operation by the IAB-DU simultaneously based on determining that: the second transmission uses the reference signal as a source of a spatial quasi-collocation (QCL); and the availability indication indicates that the resource is available.

In certain embodiments, the first configuration comprises a channel state information reference signal (CSI-RS) configuration or a transmission configuration indication (TCI) configuration.

In some embodiments, the resource comprises a symbol or a group of resource blocks (RBs).

In various embodiments, the control message comprises a medium access control (MAC) message.

In one embodiment, the spatial QCL comprises a QCL Type D.

In certain embodiments: the first operation is a first transmission or a first reception; and the second operation is a second transmission or a second reception.

In one embodiment, a method of an integrated access and backhaul (IAB) node comprising an IAB mobile terminal (IAB-MT) and an IAB distributed unit (IAB-DU) comprises: receiving a first configuration of a reference signal associated with the IAB-DU; receiving a second configuration of a resource associated with the IAB-DU, wherein the second configuration indicates that the resource is soft; receiving a control message from a parent node, wherein the control message comprises an index to the reference signal; receiving an availability indication from the parent node, wherein the availability indication indicates whether the resource is available; and determining whether to perform a first operation by the IAB-MT and a second operation by the IAB-DU simultaneously based on determining that: the second transmission uses the reference signal as a source of a spatial quasi-collocation (QCL); and the availability indication indicates that the resource is available.

In certain embodiments, the first configuration comprises a channel state information reference signal (CSI-RS) configuration or a transmission configuration indication (TCI) configuration.

In some embodiments, the resource comprises a symbol or a group of resource blocks (RBs).

In various embodiments, the control message comprises a medium access control (MAC) message.

In one embodiment, the spatial QCL comprises a QCL Type D.

In certain embodiments: the first operation is a first transmission or a first reception; and the second operation is a second transmission or a second reception.

In one embodiment, an apparatus comprises a parent node. The apparatus further comprises: a transmitter that: transmits a first configuration of a reference signal associated with an integrated access and backhaul (IAB) distributed unit (IAB-DU) to an IAB node, wherein the IAB node comprises an IAB mobile terminal (IAB-MT) and the IAB-DU; transmits a second configuration of a resource associated with the IAB-DU to the IAB node, wherein the second configuration indicates that the resource is soft; transmits a control message to the IAB node, wherein the control message comprises an index to the reference signal; and transmits an availability indication to the IAB node, wherein the availability indication indicates whether the resource is available; wherein whether to perform a first operation by the IAB-MT and a second operation by the IAB-DU simultaneously is determined based on determining that: the second transmission uses the reference signal as a source of a spatial quasi-collocation (QCL); and the availability indication indicates that the resource is available.

In certain embodiments, the first configuration comprises a channel state information reference signal (CSI-RS) configuration or a transmission configuration indication (TCI) configuration.

In some embodiments, the resource comprises a symbol or a group of resource blocks (RBs).

In various embodiments, the control message comprises a medium access control (MAC) message.

In one embodiment, the spatial QCL comprises a QCL Type D.

In certain embodiments: the first operation is a first transmission or a first reception; and the second operation is a second transmission or a second reception.

In one embodiment, a method of a parent node comprises: transmitting a first configuration of a reference signal associated with an integrated access and backhaul (IAB) distributed unit (IAB-DU) to an IAB node, wherein the IAB node comprises an IAB mobile terminal (IAB-MT) and the IAB-DU; transmitting a second configuration of a resource associated with the IAB-DU to the IAB node, wherein the second configuration indicates that the resource is soft; transmitting a control message to the IAB node, wherein the control message comprises an index to the reference signal; and transmitting an availability indication to the IAB node, wherein the availability indication indicates whether the resource is available; wherein whether to perform a first operation by the IAB-MT and a second operation by the IAB-DU simultaneously is determined based on determining that: the second transmission uses the reference signal as a source of a spatial quasi-collocation (QCL); and the availability indication indicates that the resource is available.

In certain embodiments, the first configuration comprises a channel state information reference signal (CSI-RS) configuration or a transmission configuration indication (TCI) configuration.

In some embodiments, the resource comprises a symbol or a group of resource blocks (RBs).

In various embodiments, the control message comprises a medium access control (MAC) message.

In one embodiment, the spatial QCL comprises a QCL Type D.

In certain embodiments: the first operation is a first transmission or a first reception; and the second operation is a second transmission or a second reception.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for performing a network function, the apparatus comprising:
   at least one memory; and
   at least one processor coupled with the at least one memory and configured to cause the apparatus to:
   receive a first configuration of a reference signal associated with an integrated access and backhaul (IAB) distributed unit (IAB-DU);
   receive a second configuration of a resource associated with the IAB-DU, wherein the second configuration indicates that the resource is soft;
   receive a control message from a parent node, wherein the control message comprises an index to the reference signal; and
   receive an availability indication from the parent node, wherein the availability indication indicates whether the resource is available; and
   determine whether to transmit on the resource based in part on determining that:
      an IAB mobile terminal (IAB-MT) performs a simultaneous operation while applying a spatial filter associated with the reference signal, a transmission configuration indication (TCI) comprising an identifier of the reference signal, or a combination thereof; and
      the availability indication indicates that the resource is available.

2. The apparatus of claim 1, wherein the at least one processor is configured to cause the apparatus to determine whether to transmit on the resource is further based on the processor determining that the transmission is associated with a configured multiplexing method.

3. The apparatus of claim 1, wherein the first configuration comprises a channel state information reference signal (CSI-RS) configuration or a sounding reference signal (SRS).

4. The apparatus of claim 1, wherein the resource comprises at least one symbol or at least one group of resource blocks (RBs).

5. The apparatus of claim 1, wherein the control message comprises a medium access control (MAC) message.

6. The apparatus of claim 5, wherein the MAC message is a beam restriction message.

7. A method of performing a network function, the method comprising:
   receiving a first configuration of a reference signal associated with an integrated access and backhaul (IAB) distributed unit (IAB-DU);
   receiving a second configuration of a resource associated with the IAB-DU, wherein the second configuration indicates that the resource is soft;
   receiving a control message from a parent node, wherein the control message comprises an index to the reference signal; and
   receiving an availability indication from the parent node, wherein the availability indication indicates whether the resource is available; and
   determining whether to transmit on the resource based in part on determining that:
      an IAB mobile terminal (IAB-MT) performs a simultaneous operation while applying a spatial filter associated with the reference signal, a transmission configuration indication (TCI) comprising an identifier of the reference signal, or a combination thereof; and
      the availability indication indicates that the resource is available.

8. The method of claim 7, wherein determining whether to transmit on the resource is further based on determining that the transmission is associated with a configured multiplexing method.

9. An apparatus for performing a network function, the apparatus comprising:
- at least one memory; and
- at least one processor coupled with the at least one memory and configured to cause the apparatus to:
  - receive a first configuration of a reference signal associated with an integrated access and backhaul (IAB) distributed unit (IAB-DU);
  - receive a second configuration of a resource associated with the IAB-DU, wherein the second configuration indicates that the resource is soft;
  - receive a control message from a parent node, wherein the control message comprises an index to the reference signal; and
  - receive an availability indication from the parent node, wherein the availability indication indicates whether the resource is available; and
  - determine whether to perform a first operation by an IAB mobile terminal (IAB-MT) and a second operation by the IAB-DU simultaneously based in part on determining that:
    - the second operation uses the reference signal as a source of a spatial quasi-collocation (QCL); and
    - the availability indication indicates that the resource is available.

10. The apparatus of claim 9, wherein the first configuration comprises a channel state information reference signal (CSI-RS) configuration or a transmission configuration indication (TCI) configuration.

11. The apparatus of claim 9, wherein the resource comprises at least one symbol or at least one group of resource blocks (RBs).

12. The apparatus of claim 9, wherein the control message comprises a medium access control (MAC) message.

13. The apparatus of claim 12, wherein the MAC message is a beam restriction message.

14. The apparatus of claim 9, wherein the spatial QCL comprises a QCL Type D.

15. The apparatus of claim 9, wherein:
- the first operation is a first transmission or a first reception; and
- the second operation is a second transmission or a second reception.

16. A method of performing a network function, the method comprising:
- receiving a first configuration of a reference signal associated with an integrated access and backhaul (IAB) distributed unit (IAB-DU);
- receiving a second configuration of a resource associated with the IAB-DU, wherein the second configuration indicates that the resource is soft;
- receiving a control message from a parent node, wherein the control message comprises an index to the reference signal; and
- receiving an availability indication from the parent node, wherein the availability indication indicates whether the resource is available; and
- determining whether to perform a first operation by an IAB mobile terminal (IAB-MT) and a second operation by the IAB-DU simultaneously based in part on determining that:
  - the second operation uses the reference signal as a source of a spatial quasi-collocation (QCL); and
  - the availability indication indicates that the resource is available.

17. The method of claim 16, wherein the first configuration comprises a channel state information reference signal (CSI-RS) configuration or a transmission configuration indication (TCI) configuration.

18. The method of claim 16, wherein the resource comprises at least one symbol or at least one group of resource blocks (RBs).

19. The method of claim 16, wherein the control message comprises a medium access control (MAC) message.

20. The method of claim 19, wherein the MAC message is a beam restriction message.

* * * * *